US012748562B2

(12) United States Patent
Mao

(10) Patent No.: US 12,748,562 B2
(45) Date of Patent: Sep. 29, 2026

(54) ELECTRONIC SIGN CONTROL SYSTEM AND METHOD, AND STORAGE MEDIUM AND ELECTRONIC DEVICE

(71) Applicant: BOE TECHNOLOGY GROUP CO., LTD., Beijing (CN)

(72) Inventor: Zongxin Mao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/995,660

(22) PCT Filed: Dec. 7, 2022

(86) PCT No.: PCT/CN2022/137290

§ 371 (c)(1),
(2) Date: Jan. 16, 2025

(87) PCT Pub. No.: WO2024/119408

PCT Pub. Date: Jun. 13, 2024

(65) Prior Publication Data

US 2026/0044296 A1 Feb. 12, 2026

(51) Int. Cl.

*G06F 3/14* (2006.01)
*G06T 11/60* (2006.01)
*G09F 9/30* (2006.01)
*H04L 41/22* (2022.01)

(52) U.S. Cl.

CPC ............ *G06F 3/1423* (2013.01); *G06T 11/60* (2013.01); *G09F 9/30* (2013.01); *H04L 41/22* (2013.01)

(58) Field of Classification Search

CPC ...... G06Q 10/10; G06Q 30/02; G06Q 20/208; H04W 72/542
USPC ........................................ 705/26.1; 715/728
See application file for complete search history.

(56) References Cited

U.S. PATENT DOCUMENTS

| | | | | |
|---|---|---|---|---|
| 2005/0261928 | A1* | 11/2005 | Skeadas | G06Q 30/02 705/26.1 |
| 2008/0284566 | A1 | 11/2008 | Zai et al. | |
| 2016/0371735 | A1* | 12/2016 | Walden | H04W 72/542 |
| 2016/0377697 | A1 | 12/2016 | Sella | |
| 2022/0147300 | A1* | 5/2022 | Healey | G06Q 20/208 |

(Continued)

FOREIGN PATENT DOCUMENTS

| | | | |
|---|---|---|---|
| CN | 102752855 | A | 10/2012 |
| CN | 109874135 | A | 6/2019 |
| CN | 111490896 | A | 8/2020 |

(Continued)

OTHER PUBLICATIONS

International Search Report of application No. PCT/CN2022/137290 dated Aug. 24, 2023.

(Continued)

*Primary Examiner* — Abdul-Samad A Adediran
(74) *Attorney, Agent, or Firm* — Calfee, Halter & Griswold LLP

(57) ABSTRACT

An electronic signage control system includes a gateway, communicatively connected to one or more electronic signages in a target area; and a visual configuration module displaying a layout view of the target area including an identifier of the electronic signage. A position of the identifier of the electronic signage corresponds in real time to a physical position of the electronic signage in the target area.

20 Claims, 20 Drawing Sheets

(56) References Cited

U.S. PATENT DOCUMENTS

2023/0107617 A1* 4/2023 Li .......................... G06Q 10/10
715/728

FOREIGN PATENT DOCUMENTS

| | | | |
|---|---|---|---|
| CN | 112311573 | A | 2/2021 |
| CN | 113114719 | A | 7/2021 |
| CN | 114449498 | A | 5/2022 |
| CN | 114580685 | A | 6/2022 |
| WO | 2021120206 | A1 | 6/2021 |

OTHER PUBLICATIONS

Written Opinion of application No. PCT/CN2022/137290 dated Aug. 24, 2023.

* cited by examiner

Refresh time setting:
10 minutes before conference

Template download

Import information

| Position Number: | A Side B Side AB Side | Device MAC | Text | Operation |
|---|---|---|---|---|
| 001 | AB Side | FD 65 A0 D0 96 A0 | Andy | Preview Delete |
| 002 | AB Side | F0 DC 62 19 D7 99 | Ben | Preview Delete |
| 003 | AB Side | C0 F5 AA DF A6 E2 | Charlie | Preview Delete |

FIG. 10

Refresh time setting: 10 minutes before conference

Template download | Import information

| Position Number: | A Side B Side AB Side | Device MAC | Text | Operation |
|---|---|---|---|---|
| 001 | AB Side | FD 65 A0 D0 96 A0 | Andy | Preview Delete |
| 002 | AB Side | F0 DC 62 19 D7 99 | Ben | Preview Delete |
| 003 | AB Side | C0 F5 AA DF A6 E2 | Charlie | Preview Delete |

```
[
    {
        "y":130,
        "x":54,
        "url":"8887417704292734-1640688770878.png",//indicating file name of logo on server
        "type":2,//type2 indicating logo
        "h":221,
        "w":310
    },
    {
        "textColor":1,// font color, 0 indicating white, 1 indicating black, 2 indicating red, 3 indicating yellow
        "y":0,
        "x":305,
        "area":0,// layout manner, 0 indicating horizontal layout, 1 indicating vertical layout, 2 indicating horizontal left,
        "fontSize":72,// font size           3 indicating horizontal right, 4 indicating horizontal center
        "text":"information",//text block content
        "font":" boldface.ttf",//font name
        "type":0//type0 indicating text block
    },
    {
        "previewImage":"7147856169662608-1640683768453.png",// filename of preview image on server
        "type":1//type1 indicating preview image
    },
    {
        "type":3,//type3 indicating table
        "x":111,// table x
        "y":222,// table y
        "w":200,// table width
        "h":200,// table height
        "rowDisplayLimits":3,// display limit on number of rows
        "columns":[
            {
                "index":1,// serial number
                "source":"conferenceTime",// source conferenceTime,conferenceSubject,conferenceBookingUser,conferenceBookingPhone
                "head":{
                    "fontSize":72,// font size
                    "text":"conference time",//text block content
                    "font":"boldface.ttf",//font name
                    "textColor":1,// font color, 0 indicating white, 1 indicating black, 2 indicating red
                    "x":111,// table header text x
                    "y":222// table header text y
                    "area":4,// layout manner, 2 indicating horizontal left, 3 indicating horizontal right, 4 indicating horizontal center
                },
                "body":{
                    "fontSize":72,// font size
                    "text":"information 1",//text block content
                    "font":"boldface.ttf",//font name
                    "textColor":1,// font color, 0 indicating white, 1 indicating black, 2 indicating red
                    "area":2,//layout manner, 2 indicating horizontal left, 3 indicating horizontal right, 4 indicating horizontal center
                    "cellsTextY":[111,222,333]// y of each text of table in a column
                }
            }
        ]
    },
```

FIG. 14

```
{
    "type":3,//type3 indicating table
    "x":111,// table x
    "y":222,// table y
    "w":200,// table width
    "h":200,// table height
    "rowDisplayLimits":1,// display limit on number of rows
    "columns":[
        {
            "index":1,// serial number
            "source":"conferenceStatus",//source conferenceStatusBookingUser,conferenceStatusBookingPhone,conferenceStatus
            "body":{
                "fontSize":72,//font size
                "text":"information ",//text block content
                "font": "boldface .ttf ",//font name
                "textColor":1,//font color, 0 indicating white, 1 indicating black, 2 indicating red, 3 indicating yellow
                "area":2,//layout manner, 2 indicating horizontal left, 3 indicating horizontal right, 4 indicating horizontal center
                "cellsTextY":[111],//y of each text of table in a column
                "textPrefix":"booking person:"//text prefix
            }
        }
    ]
},
{
    "type":4,//type4indicating dynamic text
    "x":111,
    "y":222,
    "area":0,//layout manner, 0 indicating horizontal layout, 1 indicating vertical layout, 2 indicating horizontal left, 3 indicating
    "fontSize":72,//font size                    horizontal right, 4 indicating horizontal center
    "text":"conference room name",text block content
    "font":"boldface.ttf ",//font name
    "textColor":1,//font color, 0 indicating white, 1 indicating black, 2 indicating red
    "source":"conferenceRoomName"//source conferenceRoomName, doorplateBattery, conferenceSubject
},
{
    "y":130,
    "x":54,
    "type":5,//type5 indicating dynamic image
    "subType":1,// subtype, 1 indicating conference room QR code, 2 indicating battery level
    "h":231,
    "w":210,
    "source":"https://10.1.1.1/login?conferenceRoomId",//source, QR code, doorplateBattery
}
}
```

FIG. 16

ELECTRONIC SIGN CONTROL SYSTEM AND METHOD, AND STORAGE MEDIUM AND ELECTRONIC DEVICE

CROSS-REFERENCE TO RELATED APPLICATIONS

The present application is a U.S. National Stage of International Application No. PCT/CN2022/137290 filed on Dec. 7, 2022, the entire contents of which are incorporated herein by reference for all purposes.

TECHNICAL FIELD

Embodiments of the present disclosure relate to the technical field of the Internet of Things, and specifically, to an electronic signage control system, an electronic signage control method, a computer-readable storage medium, and an electronic device.

BACKGROUND

The low-carbon and environmentally friendly concept is gradually applied in various industries, and electronic signages are applied in more and more scenarios. For example, in a conference site, the electronic signage may be used to display a name of attendee and other information. In comparison with a paper table card, the electronic signage facilitates quick replacement of attendee information and saves resources.

However, in the related art, in the process of managing and controlling the electronic signage through an electronic signage control system, there are problems such as lower visualization and more cumbersome operation.

It is to be noted that the information disclosed in the above background section is only used to enhance the understanding of the background of the present disclosure, and thus may include information that does not constitute the prior art known to a person skilled in the art.

SUMMARY

The present disclosure provides an electronic signage control system, an electronic signage control method, a computer-readable storage medium, and an electronic device.

An aspect of the present disclosure provides an electronic signage control system, including:

- a gateway, communicatively connected to one or more electronic signages in a target area; and
- a visual configuration module, configured to display a layout view of the target area including an identifier of the electronic signage, wherein a position of the identifier of the electronic signage corresponds in real time to a physical position of the electronic signage in the target area.

In an embodiment of the present disclosure, the system further includes:

- a computing module, configured to determine the physical position of the electronic signage based on positioning information of the electronic signage.

In an embodiment of the present disclosure:

- the electronic signage has an inbuilt positioning unit, and the inbuilt positioning unit is configured to generate the positioning information; or
- the system further includes an auxiliary positioning unit, and the auxiliary positioning unit is arranged in the target area for generating the positioning information.

In an embodiment of the present disclosure, the system further includes:

- a computing module, configured to determine the physical position of the electronic signage based on communication link quality information between the gateway and the electronic signage.

In an embodiment of the present disclosure, the system further includes:

- a computing module, configured to determining a position of the electronic signage relative to the gateway based on communication link quality information between the gateway and the electronic signage, and
- the visual configuration module is specifically configured to: display the layout view of the target area including an identifier of the gateway; and display the identifier of the electronic signage in the layout view based on the position of the electronic signage relative to the gateway.

In an embodiment of the present disclosure, displaying the layout view of the target area including the identifier of the gateway includes:

- receiving layout information of the target area and generating the layout view based on the layout information; and
- configuring, in response to a first coordinate selection operation, a position of the identifier of the gateway in the layout view based on a target position of the first coordinate selection operation.

In an embodiment of the present disclosure, the visual configuration module is further configured to:

- receive scanning area configuration information and determine a scanning area of the gateway based on the scanning area configuration information.

In an embodiment of the present disclosure, determining the position of the electronic signage relative to the gateway includes:

- calculating a distance between the gateway and the electronic signage based on the communication link quality information between the gateway and the electronic signage; and
- determining the position of the electronic signage relative to the gateway based on the position of the identifier of the gateway in the layout view and the distance.

In an embodiment of the present disclosure, determining the position of the electronic signage relative to the gateway based on the position of the identifier of the gateway in the layout view and the distance includes:

- when the system includes one gateway, determining the position of the electronic signage relative to the gateway based on the distance within the scanning area by taking the position of the identifier of the gateway in the layout view as a starting point; and
- when the system includes a plurality of gateways, determining the position of the electronic signage relative to each of the gateways within the scanning area by a least square method based on the positions of the identifiers of the gateways in the layout view and the respective distances.

In an embodiment of the present disclosure, the visual configuration module is further configured to:

- adjust, in response to a second coordinate selection operation, the position of the identifier of the electronic signage in the layout view based on a target position of the second coordinate selection operation.

In an embodiment of the present disclosure, the visual configuration module is further configured to:

differentially display, in response to an electronic signage binding operation, the electronic signage targeted by the electronic signage binding operation.

In an embodiment of the present disclosure, the visual configuration module is further configured to:

in response to a configuration operation of the electronic signage, obtain a target position targeted by the configuration operation and obtain display data configured by the configuration operation, wherein the display data is configured to indicate at least a portion of a display content of the electronic signage corresponding to the target position.

In an embodiment of the present disclosure, obtaining the target position targeted by the configuration operation and obtaining the display data configured by the configuration operation includes:

parsing one or more configuration parameters input, the configuration parameters including the target position and the display data corresponding to the target position.

In an embodiment of the present disclosure, the visual configuration module is further configured to:

in response to a first electronic signage configuration operation, set at least one of the electronic signages as an electronic doorplate, and configure display data of the electronic doorplate; and/or in response to a second electronic signage configuration operation, set at least one of the electronic signages as an electronic table card, and configure display data of the electronic table card.

In an embodiment of the present disclosure, configuring the display data of the electronic doorplate includes:

generating, in response to a configuration operation for one or more first preset controls, one or more electronic doorplate page templates based on the first preset control; and determining the display data of the electronic doorplate based on received conference information and a selected electronic doorplate page template.

In an embodiment of the present disclosure, configuring the display data of the electronic table card includes:

generating, in response to a configuration operation for one or more second preset controls, one or more electronic table card page templates based on the second preset control; and determining the display data of the electronic table card based on received attendee information and a selected electronic table card page template.

In an embodiment of the present disclosure, the visual configuration module is further configured to:

update the identifier of the electronic signage in the layout view based on configuration information after the display data of the electronic signage is configured.

In an embodiment of the present disclosure, the system further includes:

a first image processing module, configured to generate a first display image based on the display data of the electronic doorplate and transmit the first display image to the electronic doorplate for display; and/or a second image processing module, configured to generate a second display image based on the display data of the electronic table card and transmit the second display image to the electronic table card for display.

In an embodiment of the present disclosure, generating the first display image based on the display data of the electronic doorplate includes:

parsing a target preset control included in a selected electronic doorplate page template;

creating a first data block based on received conference information and the target preset control; and synthesizing the first display image by drawing the first data block on a base image.

In an embodiment of the present disclosure, generating the second display image based on the display data of the electronic table card includes:

parsing a target preset control included in a selected electronic table card page template;

creating a second data block based on received attendee information and the target preset control; and synthesizing the second display image by drawing the second data block on a base image.

In an embodiment of the present disclosure, the number of the gateways and of the number of the electronic signages are more than one, and the system further includes:

a computing module, configured to dynamically determine a data distribution route for respective electronic signages so as to optimize communication link quality information between the gateway and the electronic signage.

In an embodiment of the present disclosure, the computing module is further configured to:

determine a network quality, wherein determining the network quality includes determining the network quality of each of the gateways under a currently adopted data distribution route and the network quality of each of the gateways under another available data distribution route;

attempt to adjust a service of a gateway with a worst network quality under the currently adopted data distribution route to a gateway with a best network quality under a data distribution route with a next worst network quality of that gateway with the worst network quality; and if the network quality of each of the gateways under an adjusted data distribution route satisfies a judgement condition, go to the step of determining the network quality to continue an iteration.

In an embodiment of the present disclosure, the gateway is further configured to:

re-distribute data to the electronic signage after a specified time when the gateway fails to distribute the data to the electronic signage, wherein the specified time grows exponentially.

In an embodiment of the present disclosure, the exponent is a random number within a preset range.

An aspect of the present disclosure provides an electronic signage control method, applied to a target area including one or more electronic signage communications and a gateway communicatively connected to the one or more electronic signages, including:

displaying a layout view of the target area including an identifier of the electronic signage, wherein a position of the identifier of the electronic signage corresponds in real time to a physical position of the electronic signage in the target area.

An aspect of the present disclosure provides a computer-readable storage medium having stored thereon a computer program that, when being executed by a processor, implements any electronic signage control method described above.

An aspect of the present disclosure provides an electronic device, including:

a processor; and a memory storing executable instructions of the processor, wherein the processor is configured to implement any electronic signage control method described above by executing the executable instructions.

It is to be understood that the above general description and the following detailed description are exemplary and explanatory only and do not limit the embodiments of the present disclosure.

BRIEF DESCRIPTION OF THE DRAWINGS

The accompanying drawings herein are incorporated into and form a part of the specification, illustrate embodiments consistent with the present disclosure, and are used in conjunction with the specification to explain the principle of the present disclosure. Obviously, the accompanying drawings in the following description are only some of the embodiments of the present disclosure, and a person skilled in the art may obtain other accompanying drawings from these drawings without creative work.

FIG. 10 illustrates a schematic diagram of a visual page for configuring electronic table card display information according to an example embodiment of the present disclosure.

FIG. 14 illustrates a schematic diagram of an electronic doorplate page template defined in JSON format according to an example embodiment of the present disclosure.

FIG. 16 illustrates a schematic diagram of an electronic table card page template defined in JSON format according to an example embodiment of the present disclosure.

DETAILED DESCRIPTION

Figure 1:
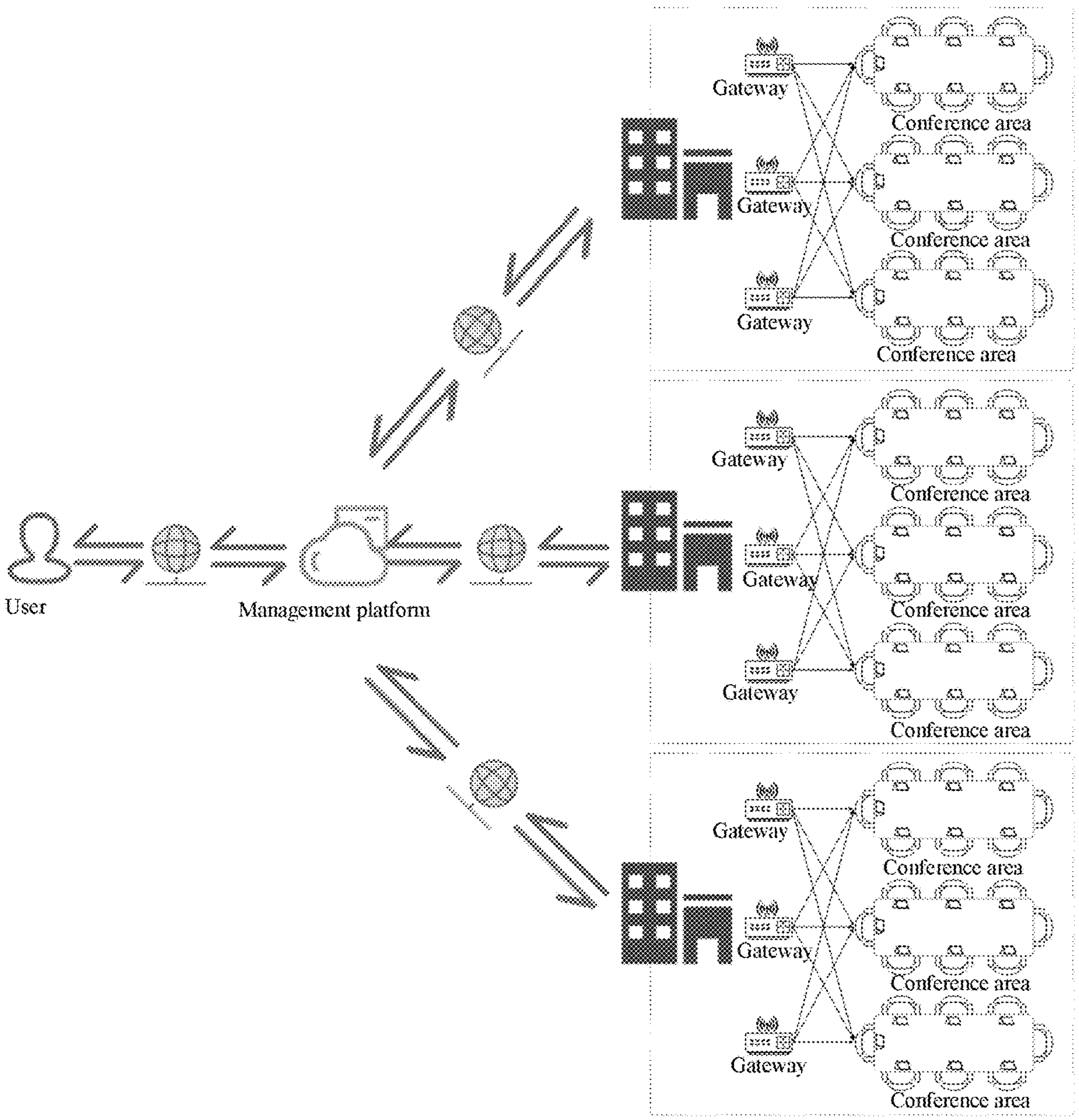
FIG. 1 illustrates a schematic diagram of an application scenario of an electronic signage control system according to an example embodiment of the present disclosure.

Example implementations will now be described more fully with reference to the accompanying drawings. However, the example implementations may be implemented in a variety of forms and should not be construed as being limited to the examples set forth herein; rather, these implementations are provided so that the present disclosure is comprehensive and complete and the concept of the example implementations is conveyed to a person skilled in the art in a comprehensive manner. The described features, structures, or characteristics may be combined in one or more implementations in any suitable manner. In the following description, many specific details are provided so as to give a full understanding of the implementations of the present disclosure. However, a person skilled in the art may realize that the technical solution of the present disclosure may be practiced without one or more of the particular details described, or by employing other methods, components, devices, steps, or the like. In other cases, the well-known technical solutions are not shown or described in detail to avoid overshadowing and obscuring aspects of the present disclosure.

In addition, the accompanying drawings are only schematic illustrations of the present disclosure and are not necessarily drawn to scale. The same reference numerals in the drawings indicate the same or similar parts, and thus repetitive descriptions thereof will be omitted. Some of the block diagrams shown in the accompanying drawings are functional entities that do not necessarily have to correspond to physically or logically separate entities. It is possible to implement these functional entities in software form, or to implement them in one or more hardware modules or integrated circuits, or to implement them in different networks and/or processor devices and/or microcontroller devices.

The electronic signage control system and method in the embodiment may be applied to a conference scenario such as lecture conference, consultation conference, training conference, teaching conference, and negotiation conference. For the conference scenario, the electronic signage may be used as a conference doorplate, a table card, a workstation plate or the like. The electronic signage may also be used in an item-on-display scenario in a shopping mall, supermarket, warehouse or the like, and for these scenarios, the electronic signage may be used as a price tag, an attribute label, an activity description label. The electronic signage may also be applied in scenarios of a restaurant, a hotel, a cinema, or the like in which table information or seating information needs to be displayed, and for these scenarios, the electronic signage may be used as a table card, a seat tag, or the like. In other words, the specific application scenario is not specifically limited in the embodiments.

An embodiment will be illustrated by taking a conference scenario as an example. Referring to FIG. 1, it illustrates a diagram of a system architecture involved in the conference scenario.

One or more electronic signages are arranged in a target area such as a conference area. In an embodiment, the electronic signage may be a signage with a display screen (EDP, E-Paper Display) using an electronic paper display technology, but may also use, for example, a liquid crystal display (LCD), an organic electroluminescence display (OLED) or the like.

The electronic signage may be communicatively connected to a management platform via a gateway. In an embodiment, the gateway may be a gateway which refers to a network edge-side IoT protocol gateway close to a physical device such as an industrial device and a sensor, and is mainly used for IoT protocol conversion. In an embodiment, the gateway and the above electronic signage may be connected via Bluetooth, WiFi, or the like. The gateway enables a more rapid and autonomous local event response, and provides a low-latency, low-cost and privacy-secure communication service. However, in other embodiments of the present disclosure, the gateway may also be other devices which can realize communication protocol conversion. For example, in some embodiments, the gateway may also be realized by an electronic signage equipped with communication protocol conversion.

The management platform may include a server and a display terminal. There may be any number of display terminals and servers as required. For example, the server may be an independent physical server, a server cluster or distributed system including a plurality of physical servers, or a cloud server providing cloud computing services. The display terminal may be an ordinary display or a display of a terminal device such as tablet computer, laptop, desktop computer, and the like. In addition, the management platform may also be implemented by other means such as a conference all-in-one machine, which however is not limited thereto. The computing module, the visual configuration module, the scheduling module, the image processing module, the device agent module, and the like described below in embodiments may all be realized by the management platform described above.

Figure 2:
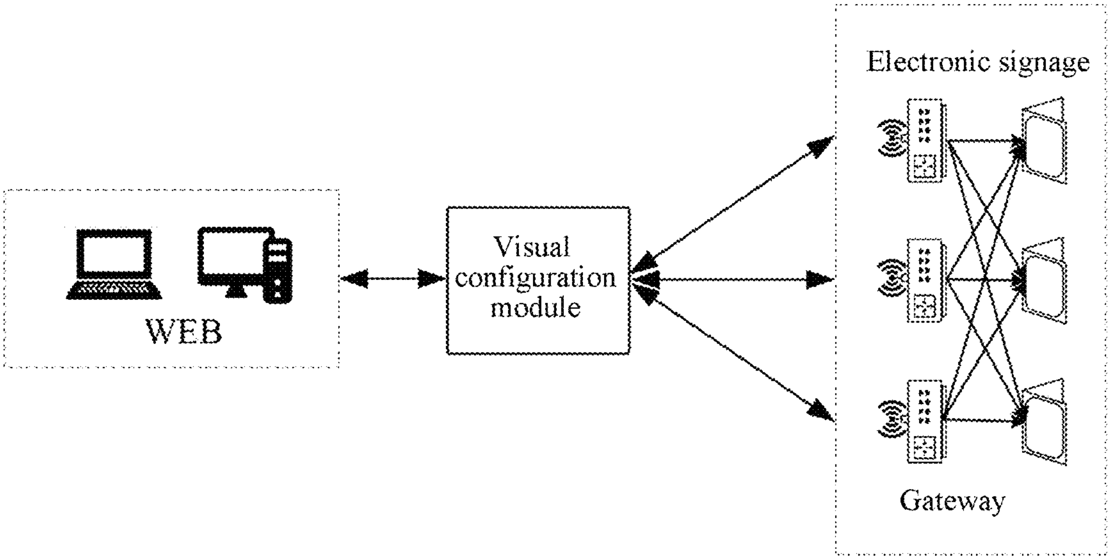
FIG. 2 illustrates a block diagram of an electronic signage control system according to an example embodiment of the present disclosure.

Referring to FIG. 2, it illustrates a schematic diagram of a module of an electronic signage control system provided in an embodiment. The electronic signage control system may include a gateway and a visual configuration module. The gateway is communicatively connected to one or more electronic signages in a target area, the visual configuration module is configured to display a layout view of the target area, and the layout view includes an identifier of the electronic signage. A position of the identifier of the electronic signage corresponds in real time to a physical position of the electronic signage in the target area.

In the above electronic signage control system, on the one hand, the visual configuration module presents the layout view of the target area and the physical position of the electronic signage in the target area, so a user can intuitively and quickly learn about information that he/she needs to learn, which improves the efficiency and accuracy of information conveying, reduces the operation of the user manually checking the information one by one and improves the interactive experience of the user; on the other hand, the position of the identifier of the electronic signage corresponds in real time to the physical position of the electronic signage in the target area, so that when the physical position of the electronic signage changes, the position of the identifier of the electronic signage may be automatically adjusted accordingly, thereby reducing the position adjustment operation of the user.

Figure 3:
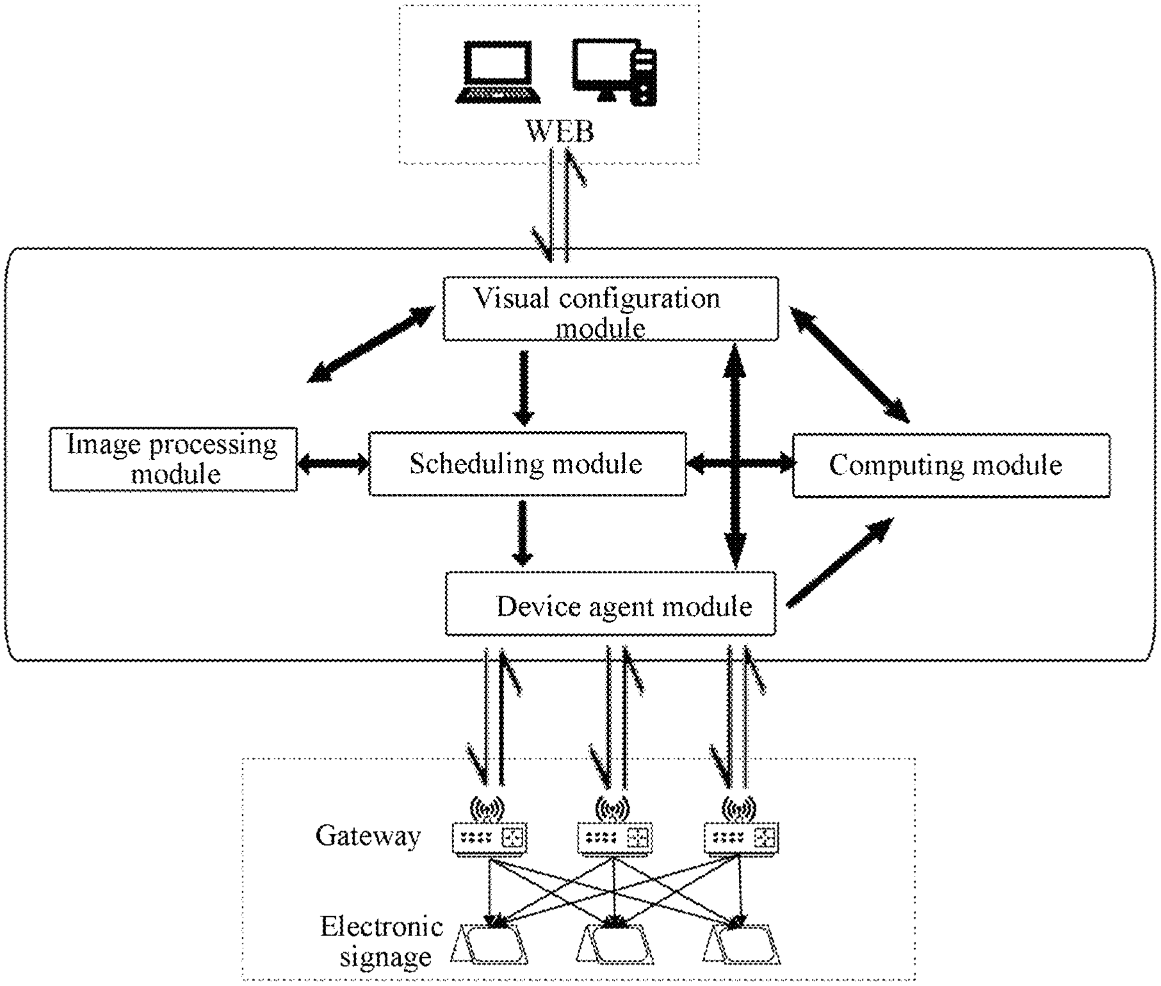
FIG. 3 illustrates a block diagram of an electronic signage control system according to an example embodiment of the present disclosure.
Figure 4:
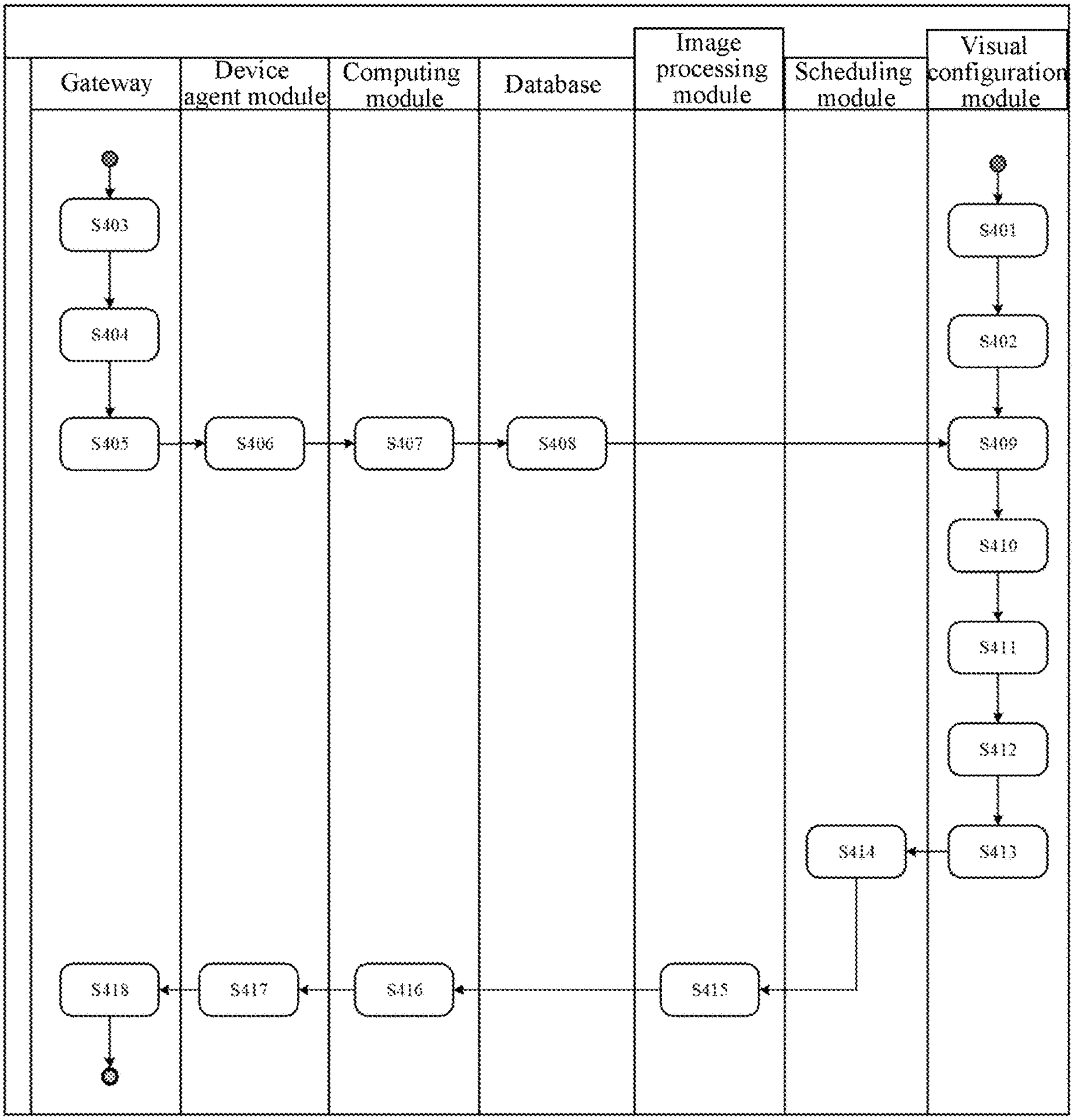
FIG. 4 illustrates a schematic flowchart of execution actions of various modules of an electronic signage control system according to an example embodiment of the present disclosure.

Hereinafter, the modules included in the electronic signage control system of the example embodiment of the present disclosure and the methods performed by the modules will be explained and illustrated in detail in conjunction with the system architecture shown in FIG. 3 and the interaction flow shown in FIG. 4.

Figure 5A:
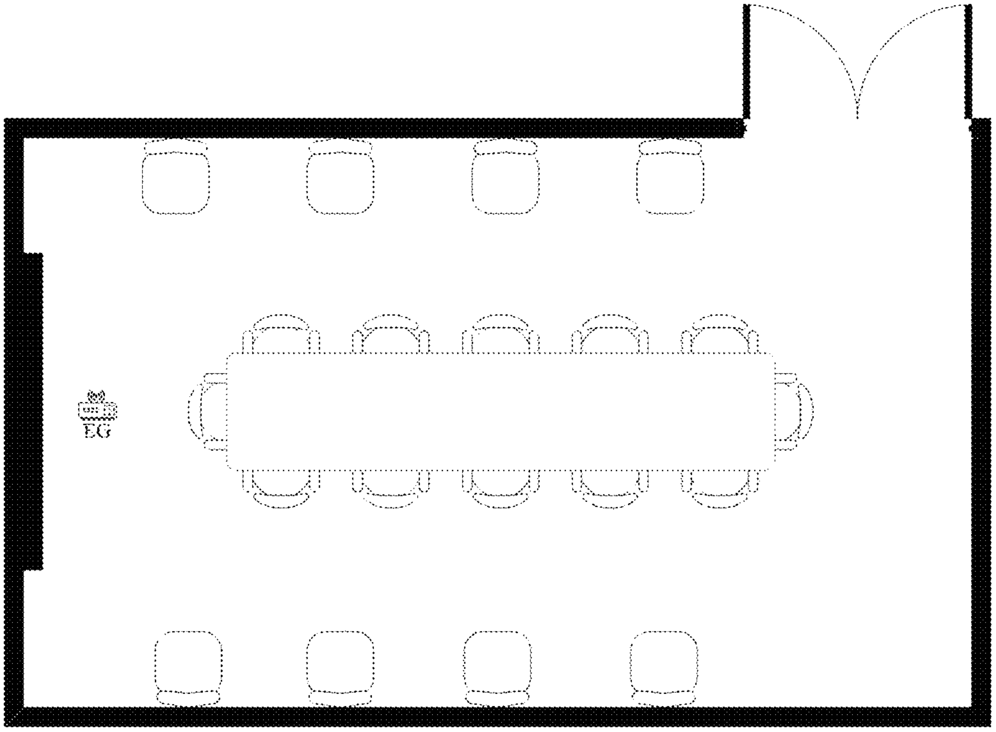
FIG. 5A illustrates a layout view according to an example embodiment of the present disclosure.

In step S401, the user may configure a layout of the target area in advance via the visual configuration module. For example, the user may input layout information (e.g., meters of length, width, etc.) of the target area to the visual configuration module. The input method may be to import a layout parameter of the target area, or to import a layout (e.g., a plane view, etc.) in a specific format, or to draw through a drawing function provided by the visual configuration module, which is not specifically limited in the embodiment. After receiving the layout information of the target area, the visual configuration module may generate a layout view as shown in FIG. 5A based on the layout information.

In step S402, after the visual configuration module generates the layout view, the user may select a point where the gateway is located in the layout view by a first coordinate selection operation. Specifically, the visual configuration module may obtain, in response to the first coordinate selection operation of the user, a target position selected by the first coordinate selection operation, and then determine the target position as the position of the identifier of the gateway in the layout view. For example, if the point EG shown in FIG. 5A is the target position of the first coordinate selection operation, the visual configuration module may display the identifier of the gateway at this position, as a subsequent positioning reference point.

Further, in some embodiments, when there are fewer positioning reference points, errors may occur in the subsequent determination of the position of the electronic signage, which may result in the electronic signage being displayed outside of the above layout view or being displayed in other unreasonable areas. Based on this, a scanning area of the gateway may also be configured by the following steps.

Figure 5B:
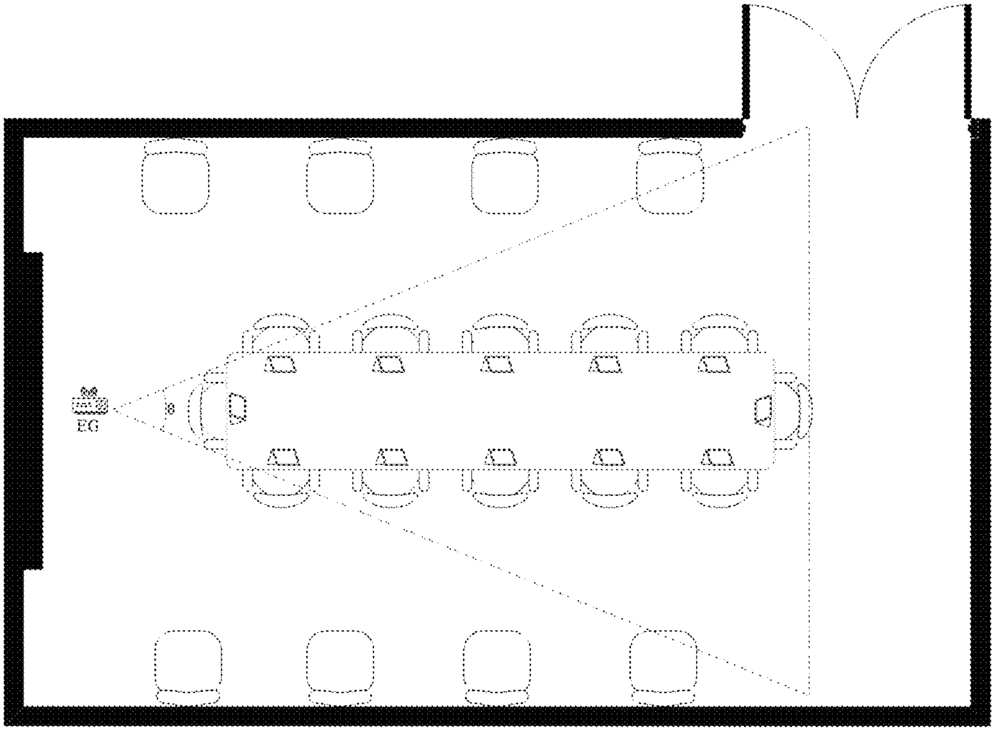
FIG. 5B illustrates a layout view according to an example embodiment of the present disclosure.

A scanning area configuration information is received and a scanning area of the gateway is determined based on the scanning area configuration information. By way of example, a circular area with the positioning reference point EG as the center of the circle may be determined as the scanning area of the gateway based on radius information configured by the user. Alternatively, referring to FIG. 5B, based on radius information and radius angle information configured by the user, a sector-shaped area with the positioning reference point EG as the center of the circle and the radius angle as $\theta$ may also be determined as the scanning area of the gateway. In other embodiments of the present disclosure, the scanning area of the gateway may also be configured in other manners, which is not specifically limited in the embodiment.

However, it is to be noted that in some embodiments, it is also possible to display the identifier of the gateway only at the stage of configuring the position of the gateway; and at other stages such as the subsequent stage of configuring display data of the electronic signage, the identifier of the gateway may not be displayed.

In some embodiments, the communication connection between the gateway and the other terminal devices may also be managed by the following steps S403 to S404, which is exemplified below.

In step S403, a port, and a network connection manner and a network address of the device agent module are configured for the gateway. The network connection manner may be a wired connection or a wireless connection such as WiFi. After the configuration is complete, the gateway may connect to the device agent module through the configured network connection manner and register as an endpoint device using the LwM2M (Lightweight Machine to Machine) protocol.

Figure 6:
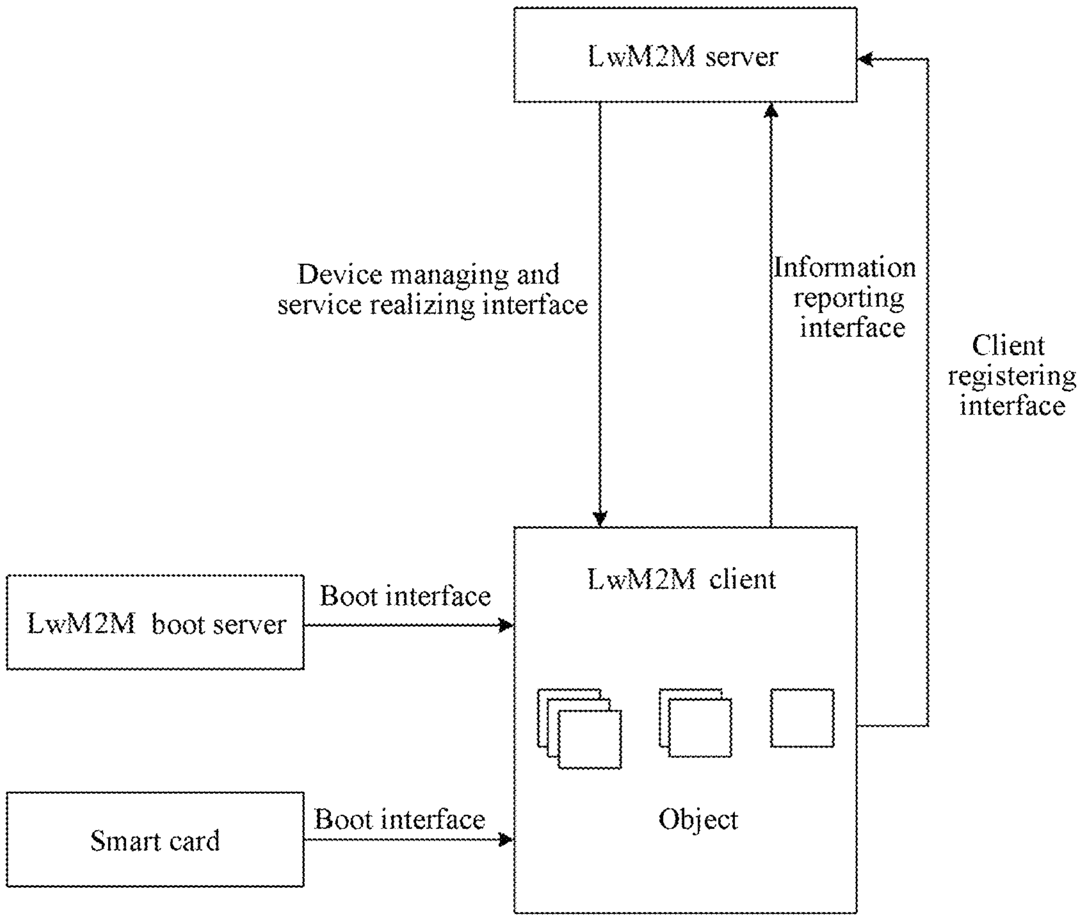
FIG. 6 illustrates a schematic flowchart of registering an endpoint device using an LwM2M protocol according to an example embodiment of the present disclosure.

Referring to FIG. 6, the entities involved in the LwM2M protocol include an LwM2M server and an LwM2M client. The LwM2M server is deployed at the M2M service provider or at the network service provider, and in an embodiment, it is deployed at the device agent module described above. The LwM2M client is deployed at the respective LwM2M device, and in an embodiment, it is deployed at the gateway described above. In addition, an LwM2M boot server or a smart card may be further included as needed to complete the initial bootstrapping of the LwM2M client. Between the above entities, the protocol defines a boot interface, a client registering interface, a device managing and service realizing interface, and an information reporting interface, in order to realize the functions of bootstrapping, registration, management, and data transmission of the gateway or the like.

By employing the LwM2M protocol, it may provide an off-the-shelf standardized object, connectivity monitoring, remote device operation and structured software upgrades and updates, it may further have a better response time and manage a larger number of gateways, and it may also ensure security at the end-to-end application layer. Of course, in other embodiments of the present disclosure, it may also employ other protocols such as MQTT (Message Queuing Telemetry Transport) or COAP (Constrained Application Protocol).

In step S404, in an embodiment, the gateway and the electronic signage may each have a built-in Bluetooth module. The gateway, after registering as an endpoint device, may automatically scan for a Bluetooth device within its range according to the Bluetooth communication protocol; and if the electronic signage is located within the range of the gateway, it may automatically transmit the current data thereof to the gateway.

The data uploaded by the electronic signage includes at least communication link quality information between the gateway and the electronic signage. The communication link quality information may be indicated by one or more indicators such as RSSI (Received Signal Strength Indication), SNR (Signal-to-Noise Ratio), PDR (Packet-Delivery Ratio), BER (Bit-Error Rate), and LQI (Link Quality Indication). In an embodiment, for example, the RSSI value is used to represent the communication link quality between the gateway and the electronic signage, but is not limited thereto.

In step S405, after obtaining the communication link quality information between the gateway and the electronic signage, the gateway may then transmit the same to the device agent module.

In step S406, after receiving uplink data from the gateway, the device agent module parses the uplink data to determine the type of the uplink data. If it determines based on the type of the uplink data that it is communication link quality information, it is stored in a database. In an embodiment, the stored data may include a gateway MAC address, a reporting time, an RSSI value, and the like. At the same time, the communication link quality information is forwarded to the above-described computing module. In addition, in order to reduce the amount of data storage, in an embodiment, only the communication link quality information within a recent period may be stored in the database. For example, only the communication link quality information within the last 15 minutes is stored, and the communication link quality information that is stored for more than 15 minutes is deleted.

It is to be noted that in some embodiments of the present disclosure, the above device agent module may also be implemented by the computing module or other modules without be provided separately, which also falls within the protection scope of the present disclosure.

In step S407, after receiving the communication link quality information between the gateway and the electronic signage, the computing module may determine the physical position of the electronic signage based on the communication link quality information. For example, a position of the electronic signage relative to the gateway may firstly be determined based on the communication link quality information, and then the physical position of the electronic signage may be determined based on the position of the electronic signage relative to the gateway.

By way of example, in an embodiment, a distance between the gateway and the electronic signage is firstly calculated based on the communication link quality information between the gateway and the electronic signage. After the distance between the gateway and the electronic signage is determined, the position of the electronic signage relative to the gateway may be determined based on the position of the identifier of the gateway in the layout view and the distance.

By taking RSSI as an example, for any electronic signage, the computing module may query the RSSI value reported historically by the electronic signage in the database, obtain therefrom the latest RSSIs of different gateways connected to the electronic signage, and then calculate the distance from the electronic signage to each gateway based on the radio attenuation model formula. After calculating the distance from the electronic signage to each gateway, the position of the electronic signage relative to each gateway is determined based on the position of the gateway. The radio attenuation model formula may be shown as follows:

$$d=10\hat{}((\mathrm{abs}(\mathrm{RSSI})-A)/(10*n))$$

where d denotes the calculated distance; RSSI denotes the received signal strength; A denotes the signal strength when the electronic signage and the gateway device are apart by 1 meter, the value of A may be obtained by pre-testing, and an optimal range thereof is between 45-49; and n is the environmental attenuation factor, which needs to be corrected by testing, and an optimal range thereof is between 3.25 and 4.5.

By way of further example, when the number of the gateways is more than one, the position of the electronic signage relative to each of the gateways is determined within the scanning area by a least square method based on the positions of the identifiers of the gateways in the layout view and the respective distances.

For example, let the coordinates of the gateways be (x1, y1) . . . (xn, yn) respectively, the coordinate of the electronic signage be (x, y), and the distances from the electronic signage to the respective gateways be d1 . . . dn respectively, then it obtains $$\begin{cases} (x-x_1)^2+(y-y_1)^2=d_1^2 \\ \vdots \\ \vdots \\ (x-x_n)^2+(y-y_n)^2=d_n^2 \end{cases}$$

after being arranged and written in matrix form, it obtains AX=b, where:

$$\begin{bmatrix} 2(x_1-x_n) & 2(y_1-y_n) \\ \vdots & \vdots \\ \vdots & \vdots \\ 2(x_{n-1}-x_n) & 2(y_{n-1}-y_n) \end{bmatrix}$$

$$b=\begin{bmatrix} x_1^2-x_n^2+y_1^2-y_n^2+d_n^2-d_1^2 \\ \vdots \\ \vdots \\ x_{n-1}^2-x_n^2+y_{n-1}^2-y_n^2+d_n^2-d_{n-1}^2 \end{bmatrix}$$

According to the least square method, it obtains $X=(A^TA)^{-1}A^Tb$, and then the coordinate of the electronic signage may be obtained by solving X.

Figure 7:
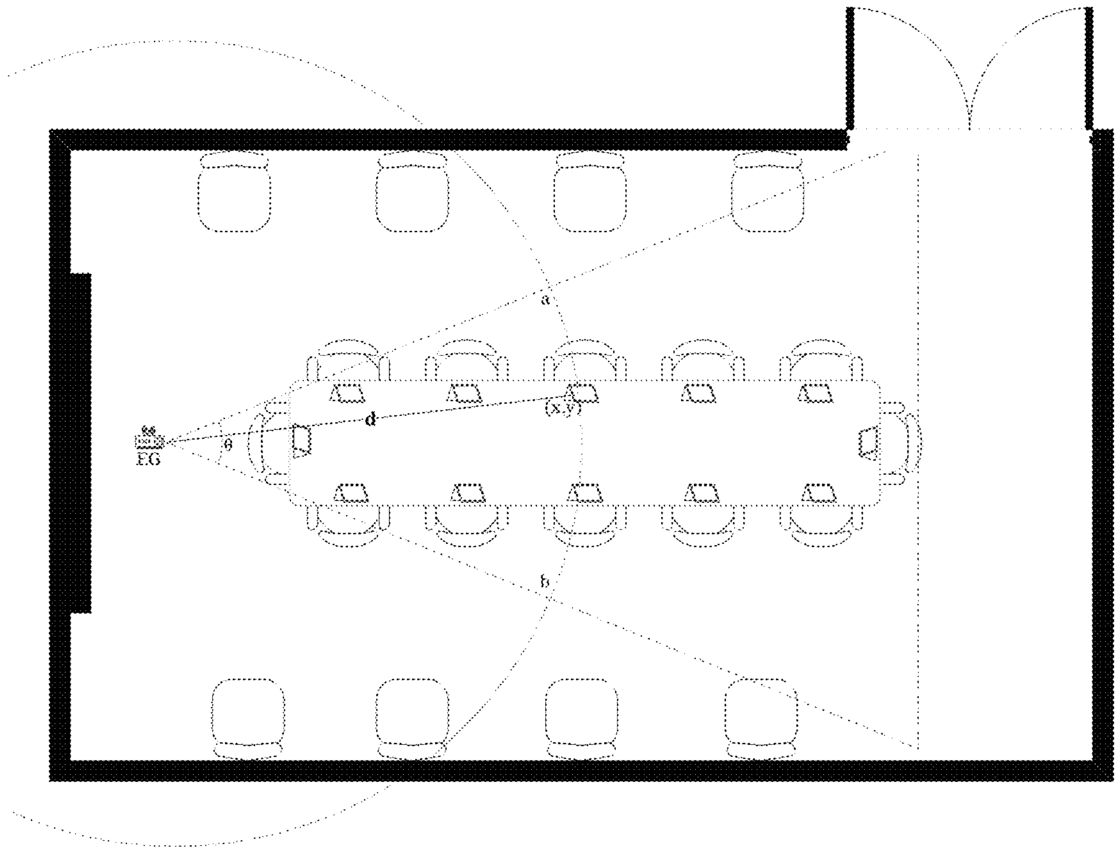
FIG. 7 illustrates a layout view according to an example embodiment of the present disclosure.

However, in some embodiments, the number of gateways may be only one. In this case, the position of the electronic signage relative to the gateway may be determined based on the gateway scanning area determined in step S402 above. By way of example, when the number of the gateways is one, the position of the electronic signage relative to the gateway may be determined based on the distance within the scanning area by taking the position of the identifier of the gateway in the layout view as a starting point For example, with reference to FIG. 7, the scanning area of the gateway is a sector-shaped area with the positioning reference point EG as the center of the circle and the radius angle as θ, therefore, a point on the arc ab may be randomly taken as the position coordinate of the electronic signage by taking the positioning reference point EG as the center of the circle and displaying the distance corresponding to the distance d between the electronic signage and the gateway.

In step S408, after obtaining the coordinate of the electronic signage in step S407, it may be stored in the database for subsequent use. If the visual configuration module displays the identifier of the electronic signage in the layout view based on the position of the electronic signage relative to the gateway, it may realize a real-time correspondence between the position of the identifier of the electronic signage and the physical position of the electronic signage in the target area. However, a person skilled in the art may easily understood that the real-time in the embodiment means determining the position of the identifier of the electronic signage based on the physical position of the electronic signage in the target area after continuously obtaining the physical position of the electronic signage in the target area. However, due to the fact that the process of the "continuously obtaining" may be affected by for example delays, sampling periods, and other factors, the update of the position of the identifier of the electronic signage may be later than the change of the physical position of the electronic signage to a certain extent, which however also belongs to the "real-time" as described in the present disclosure.

Further, it is to be noted that in the above embodiment, the position of the electronic signage is determined by taking the gateway as the reference positioning point, but in more embodiments of the present disclosure, the position of the electronic signage may also be determined in other ways. For example, the computing module may determine the physical position of the electronic signage based on the positioning information of the electronic signage.

By way of example, in some embodiments, the electronic signage may have an inbuilt positioning unit, and the inbuilt positioning unit is used to generate the positioning information. The positioning unit may for example be an inbuilt positioning chip, such as a UWB (Ultra Wide Band) indoor positioning chip, a Bluetooth indoor positioning chip and the like. In some embodiments, the system may further include an auxiliary positioning unit provided in the target area, and the positioning information may be generated by the auxiliary positioning unit. The auxiliary positioning unit may include for example an RFID (Radio Frequency Identification) auxiliary positioning unit, an infrared auxiliary positioning unit, an ultrasound auxiliary positioning unit, and the like. By taking the infrared auxiliary positioning unit as an example, it may include one or more optical sensors provided in the target area, so that the modulated infrared signal of each electronic signage may be received through these optical sensors, and the electronic signage generating such signal and the positioning information thereof are determined based on these modulated infrared signals.

In some embodiments, in order to more accurately determine the position of the electronic signage in the target area, some auxiliary positioning points may also be provided or map reconstruction positioning may be performed based on the positioning information and the map of the target area and so on, which is not specifically limited in the embodiment.

In step S409, in an embodiment of the present disclosure, the visual configuration module may also be used to assist a user in binding an electronic signage that has not yet been bound. For example, the user may query the electronic signage scanned by the gateway but not yet bound. Then, the visualization configuration module may differentially display these unbound electronic signages, for example, in a special color, in the layout view. The user may then conveniently and accurately locate the unbound electronic signage according to the display color, and complete the binding operation of the electronic signage.

In addition, in some embodiments, the distance calculated in the above step may be inaccurate due to the fact that the attenuation of the radio signal propagation is not always in accordance with the theoretical model and/or there are errors in the communication link quality information determined by the electronic signage and the gateway itself, which may further result in a deviation of the display position of the identifier of the electronic signage in the layout view.

Therefore, in an embodiment, the visual configuration module may further adjust, in response to a second coordinate selection operation, the position of the identifier of the electronic signage in the layout view based on a target position of the second coordinate selection operation. For example, assuming that the second coordinate selection operation is a mouse drag-and-drop operation, the user may manually adjust the position of the identifier of the electronic signage in the layout view by means of the mouse drag-and-drop, and the adjusted coordinate point may also be stored in the database.

After the visual configuration module presents the identifier of the electronic signage, the visual configuration module may be further used to: in response to a configuration operation of the electronic signage, obtain a target position targeted by the configuration operation and obtain display data configured by the configuration operation. The display data is used to indicate at least a portion of a display content of the electronic signage corresponding to the target position, which is exemplified below.

In an implementation, the user may directly click at an identifier position (i.e. the target position) of an electronic signage and input text to be displayed (i.e. the display data), so that the electronic signage at the target position may display an image in conjunction with the text input by the user.

In an implementation, the visual configuration module may provide a configuration list which includes an identifier position number of the electronic signage, and the user may input the text to be displayed (i.e. the display data) in the row where the identifier position number is located, so that the electronic signage corresponding to the position of the number (i.e. the target position) may display an image in conjunction with the text input by the user.

In an implementation, in order to achieve quick input of information, the user may import one or more configuration parameters from, for example, a CSV (Comma-Separated Values) file or other file, and the configuration parameters include the above target position and the display data corresponding to the target position. After the visual configuration module parses the configuration parameters, it may indicate at least a portion of the display content of the electronic signage corresponding to the target position. For example, after the user imports in batches a target position number, a name and a price of a commodity, the visual configuration module may control the electronic signage corresponding to the position of the number (i.e. the target position) to display the name and the price of the commodity.

In the several display data configuration methods described above, the display data is associated with the target position in the layout view, so that no matter which electronic signage is at the actual physical position corresponding to the target position, the content that the user needs to present may be presented at the actual physical position.

Continuing with the conference scenario as an example, in an embodiment, the electronic signage may be configured as an electronic doorplate or an electronic table card according to the needs of the user. There is a large difference in the information to be displayed on the electronic doorplate and the electronic table card. Different information may also be displayed on different electronic table cards. Therefore, the electronic signage may be further configured by the visual configuration module before the conference, which may specifically refer to steps S410 to S413 below.

In step S410, in an embodiment, the visual configuration module may set at least one of the electronic signages as an electronic doorplate in response to a first electronic signage configuration operation. For example, the electronic signage located at the entrance of the conference room is set as the electronic doorplate. After the electronic doorplate has been selected, it may configure the display data of the electronic doorplate.

Figure 8:
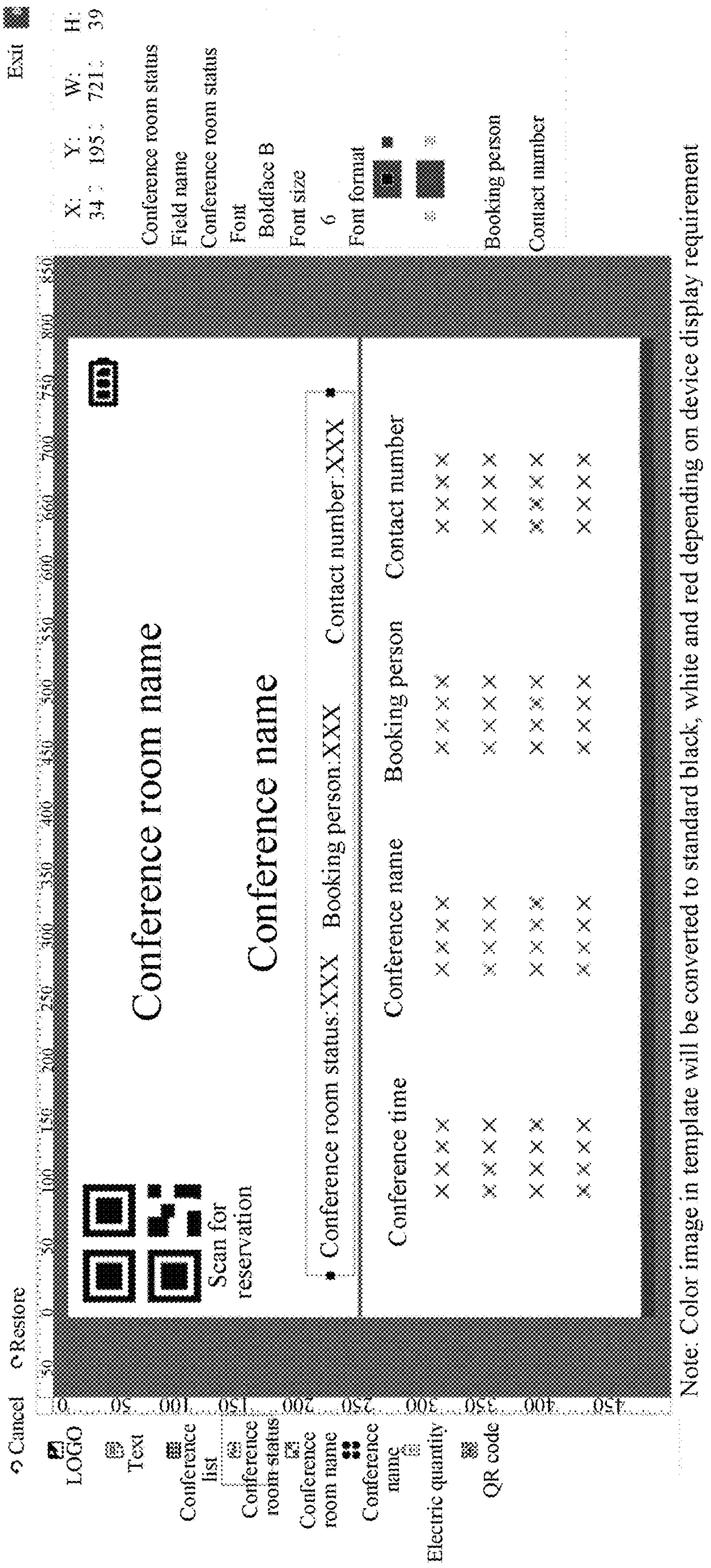
FIG. 8 illustrates a schematic diagram of a template editor according to an example embodiment of the present disclosure.

In an embodiment, in order to facilitate the user to configure the display data of the electronic doorplate more conveniently, a visual template editor is also integrated in the visual configuration module. Referring to FIG. 8, the template editor may provide a first preset control with various functions, such as a text control (for configuring conference room name, conference name, etc.), an image control (for configuring logo, base image, etc.), a table control, a conference room status control, an electric quantity control, a QR code control and the like. The template editor allows the user to select a control and configure the same in more detail, such as width, height and other dimensions of the control, coordinate of the control on the template, font and size, format, color and the like. Further, one or more electronic doorplate page templates may be generated based on the first preset control in response to a configuration operation for one or more first preset controls.

In step S411, after the one or more electronic doorplate page templates are generated, the user may select one of the templates to display the conference information, and may further select an additional template to display a specified content when the target area is idle as desired. Of course, in some embodiments of the present disclosure, the user may also directly use a preset electronic doorplate page template or a previously stored electronic doorplate page template, instead of having to generate the electronic doorplate page template each time through the above step S410, which is not specifically limited in the embodiment.

After the electronic doorplate page template is selected, the display data of the electronic doorplate may be determined based on received conference information and the selected electronic doorplate page template. The conference information may include, for example, a conference name, a conference time, and a brief description of the conference. In an embodiment, the conference information may be visualized for user input.

Figure 9:
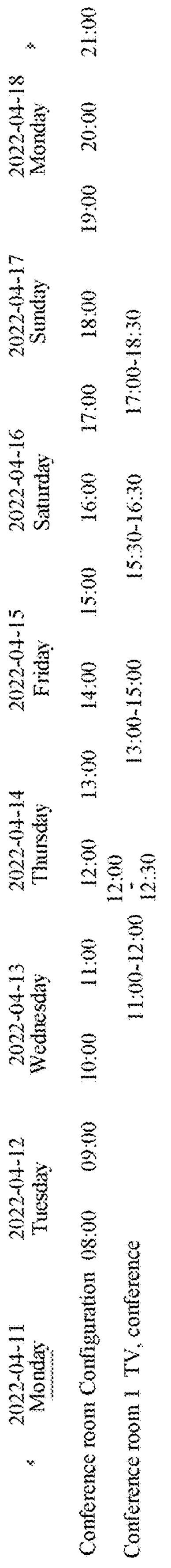
FIG. 9 illustrates a schematic diagram of conference booking information visualization achieved by using a timeline according to an example embodiment of the present disclosure.

For example, as shown in FIG. 9, the user may be presented with reserve information of the target area in a specific period (e.g., one week, etc.) by means of a timeline. The user may then observe the timeline to determine in which time windows the target area has been reserved and in which time windows it may be reserved. The user may click on a time window in which the target area may be reserved to set that time window as a reserved conference slot. In an embodiment, in order to facilitate the management of the target area, a standard duration of the above time window may also be set, for example, the standard duration of each time window may be 30 minutes, 15 minutes, or the like, and the user at least selects one time window.

In step S412, after the conference reservation is completed, the visual configuration module may set at least one of the electronic signages as an electronic table card in response to a second electronic signage configuration operation. For example, all the electronic signages located outside of the electronic doorplate are set as electronic table cards. After an electronic table card is selected, it may configure display data of the electronic doorplate.

Similar to the above step S410, the template editor described above in the embodiment may provide a second preset control with various functions such as a text control (for configuring attendee name, etc.), an image control (for configuring logo, base image, etc.), an electric quantity control, a QR code control and the like. The template editor allows the user to select a control and configure the same in more detail, such as width, height and other dimensions of the control, coordinate of the control on the template, font and size, format, color and the like. Further, one or more electronic table card page templates may be generated based on the second preset control in response to a configuration operation for one or more second preset controls.

In step S413, after the one or more electronic table card page templates are generated, the user may select one of the templates to display the table card information. Of course, in some embodiments of the present disclosure, the user may also directly use a preset electronic table card page template or a previously stored electronic table card page template, instead of having to generate the electronic table card page template each time through the above step S412, which is not specifically limited in the embodiment.

After the electronic table card page template is selected, the display data of each electronic table card may be determined based on the received attendee information and the selected electronic table card page template. The attendee information may include for example the name of the attendee, the organization to which the attendee belongs, the job title of the attendee, and the like. In an embodiment, the conference information may be visualized for user input.

For example, as shown FIG. 10, the position number of each electronic table card identifier, information for filling in the text control, and the unique identifier of the electronic table card (e.g., electronic signage MAC or device name, etc., optional) may be presented by way of a configuration list. In addition, in an embodiment, the user, through the configuration list, may also set a time parameter (e.g., 10 minutes, etc.) for refreshing the electronic table card prior to the conference, and a refresh page. In some embodiments, the user may also import the attendee information directly from a CSV (Comma-Separated Values) file or other file, which is not specifically limited in the embodiment.

Figure 11:
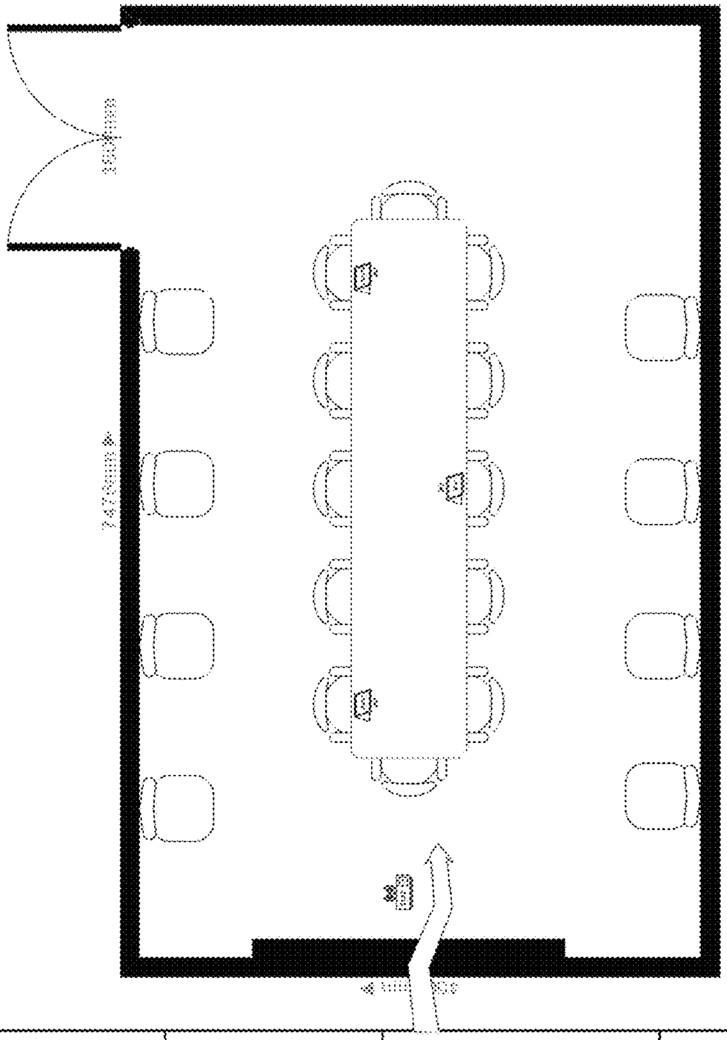
FIG. 11 illustrates a schematic diagram of a visual page for configuring electronic table card display information according to an example embodiment of the present disclosure.

Referring to FIG. 11, in an embodiment, the visual configuration module may also present the user with the above configuration list at a side of the page, and present the user with the layout view of the target area including the identifiers of the respective electronic signages at the other side of the page. After the user fills in the above information in the above configuration list, the user may drag and drop the configuration list to the layout view of the target area, thereby causing the identifier of the electronic signage in the layout view to display the preview content after configuration. In addition, in some embodiments of the present disclosure, the preview content of the electronic table card may be dynamically updated in real time in the layout view according to the filling operation of the user in the above configuration list, which also falls within the protection scope of the present disclosure.

Figure 12:
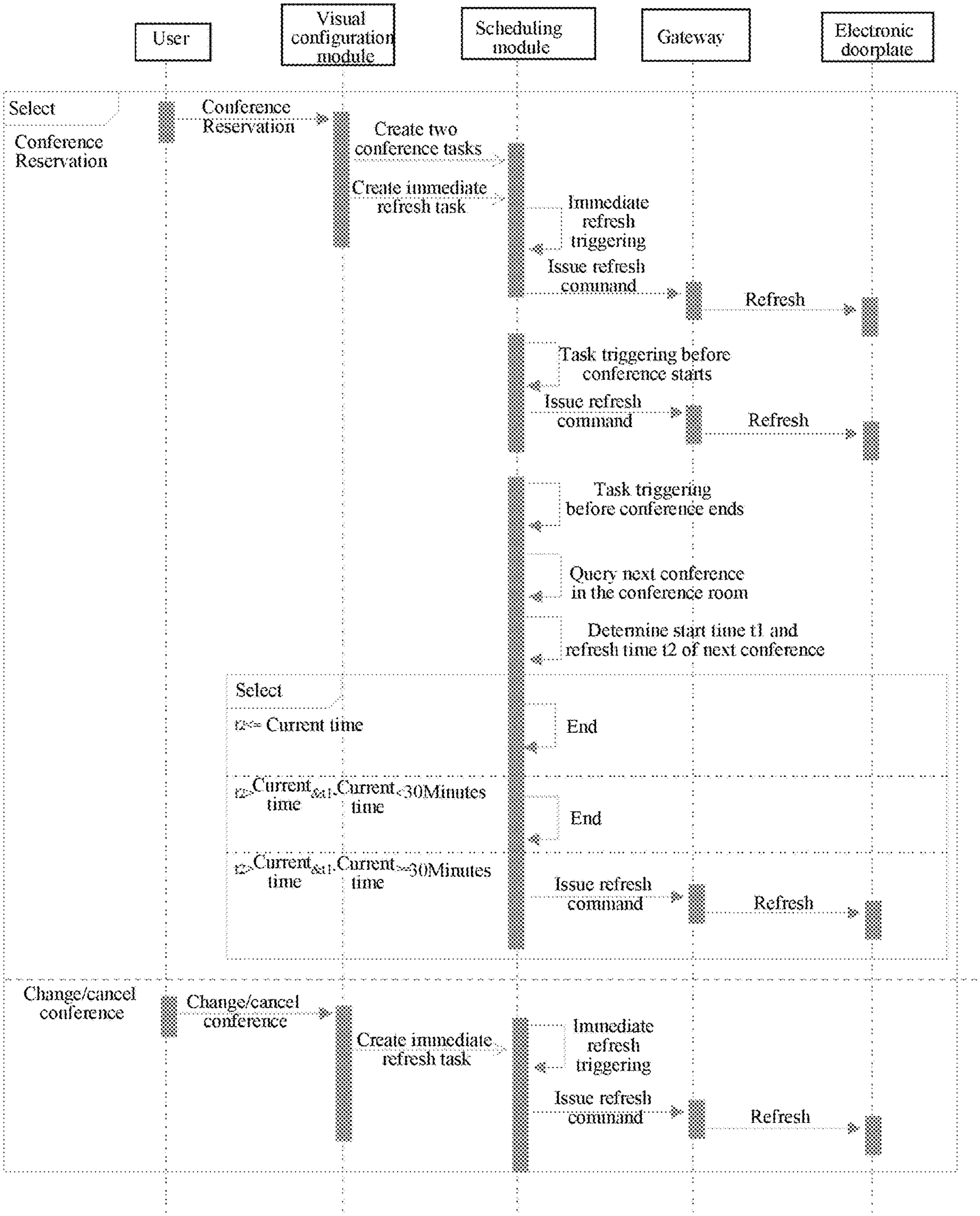
FIG. 12 illustrates a schematic diagram of an electronic doorplate refresh task scheduling process according to an example embodiment of the present disclosure.

In step S414, with reference to FIG. 12, in an embodiment, after the conference reservation is completed, the following three scheduling tasks may be automatically created by the scheduling module: a task of refreshing the electronic doorplate before the conference starts, a task of refreshing the electronic doorplate before the conference ends, and a task of refreshing the electronic table card before the conference starts. In addition, an immediate execution task may be created, i.e., a task of refreshing the electronic doorplate immediately.

The scheduling module may be a separate module or may be implemented by other modules such as the computing module. The number of scheduling tasks generated by the scheduling module may also be further increased or decreased according to actual needs, which is not specifically limited in the embodiment. These scheduling tasks are described in detail below.

Further referring to FIG. 12, the task of refreshing the electronic doorplate before the conference starts is configured to be triggered before the reserved conference start time, for example, by default, 10 minutes before the conference starts. After the scheduling task is triggered, the following first image processing module may be invoked to generate a display image of the electronic doorplate, and the input parameter of the first image processing module may include the display data of the electronic doorplate configured in the above step S411, the conference list data from the current time to 24 o'clock, and the data of the next conference, the data of the conference room, and the like. The computing module may be invoked to determine the data distribution route, and the device agent module may be invoked to distribute the display image to the electronic doorplate according to the data distribution route. The input parameter of the device agent module may include the display image of the electronic doorplate generated by the first image processing module, the data distribution route determined by the computing module, and the like.

The task of refreshing the electronic doorplate before the conference ends is configured to be triggered before the reserved conference end time, e.g., by default, 10 minutes before the conference ends. After this scheduling task is triggered, it determines whether there is a conference in the next time window. For example, it may be determined in conjunction with the start time t1 of the next conference and the to-be-triggered time t2 of the task of refreshing electronic doorplate before the conference ends for the currently reserved conference. If the time t2 is less than the current time, it is assumed that there is a conference in the next time window. If the time t2 is greater than the current time and the current time is less than 30 minutes from the time t1, it is assumed that there is a conference in the next time window. If the time t2 is greater than the current time and the current time is more than 30 minutes from the time t1, it is assumed that there is no conference in the next time window.

If there is no conference in the next time window, the first image processing module may be invoked to generate the display image, and the input parameter of the first image processing module may include the electronic doorplate page template selected in the above step S411 to be used when the target area is idle, the conference list data from the current time to 24 o'clock, the data of the conference room, and the like. The computing module is invoked to determine a data distribution route, and the device agent module is invoked to distribute the display image to the electronic doorplate according to the data distribution route. The input parameter of the device agent module may include the display image of the electronic doorplate generated by the first image processing module, the data distribution route determined by the computing module, and the like. If there is a conference in the next time window, the task of refreshing the electronic doorplate before the conference starts corresponding to the next conference is executed, and the task of refreshing the electronic doorplate before the conference ends for the currently reserved conference is cancelled, so as to avoid task conflicts.

The task of refreshing the electronic doorplate immediately is mainly used to ensure that the electronic doorplate may display the currently reserved conference in a timely manner, to ensure the timeless and accuracy of the electronic doorplate displaying the image. Therefore, this scheduling task may be triggered immediately after being established. After the scheduling task is triggered, the following first image processing module may be invoked to generate the display image of the electronic doorplate, and the input parameter of the first image processing module may include the display data of the electronic doorplate configured in the above step S411, the conference list data from the current time to 24 o'clock, and the data of the next conference, the data of the conference room, and the like. The computing module may be invoked to determine the data distribution route, and the device agent module may be invoked to distribute the display image to the electronic doorplate according to the data distribution route. The input parameter of the device agent module may include the display image of the electronic doorplate generated by the first image processing module, the data distribution route determined by the computing module, and the like. In addition, if a reserved conference is cancelled or there is an update or other change in the reserved conference, the task of refreshing the electronic doorplate immediately may also be triggered.

In step S415, in an embodiment, the first image processing module may generate a first display image based on the display data of the electronic doorplate and transmit the first display image to the electronic doorplate for display. Further, the second image processing module may generate a second display image based on the display data of the electronic table card and transmit the second display image to the electronic table card for display. In the following, the process of generating the display image by the first image processing module and by the second image processing module is further described.

Figure 13:
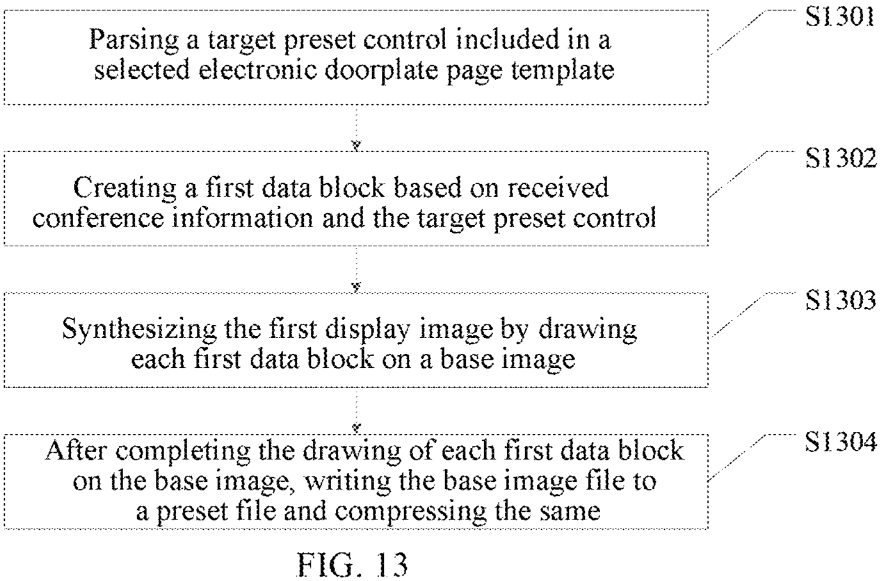
FIG. 13 illustrates a schematic flowchart of a specific image generation process of a first image processing module according to an example embodiment of the present disclosure.

The display data of the electronic doorplate configured in the above step S410 and step S411 includes conference information and a selected electronic doorplate page template. Accordingly, in an embodiment, the first image processing module may generate the first display image based on the electronic doorplate page template and the conference information. Referring to FIG. 13, the specific process of generating the image by the first image processing module may include the following step S1301 to step S1304.

In step S1301, a target preset control included in a selected electronic doorplate page template is parsed. Specifically, since the electronic doorplate page template is constructed based on the preset control, it may first parse the target preset control included in the selected electronic doorplate page template. Referring to FIG. 14, in an embodiment, the electronic doorplate page template defined in JSON format may be used, which includes an image control, a table control, a dynamic image control, a dynamic text control, or the like. Such electronic doorplate page template may be parsed by using a third-party library such as Jackson, Gson, Fastjson or the like. However, the electronic doorplate page template may also be in other formats, which is not specifically limited in the embodiment.

In step S1302, a first data block is created based on received conference information and the target preset control. Specifically, after each control is obtained through parsing, the conference information may be passed into the corresponding control. The conference information may include a conference name, a conference time, a brief description of the conference, a LOGO image URL, and the like. For example, the LOGO image or the like is loaded through the image control based on the LOGO image URL; the conference list data from the current time to 24 o'clock, and the data of the next conference, the data of the conference room, and the like are loaded through the table control and the dynamic image control; and the conference name, the brief description of the conference and the like are loaded through the text control and the dynamic text control.

In step S1303, the first display image is synthesized by drawing each first data block on a base image. Specifically, for the image data such as LOGO image, it may directly be drawn on the base image. For the text data such as conference name and brief description of the conference, it may firstly load the font set by the control, then calculates whether the text data is out of bounds (exceeding the length and width of the base image) according to the text data and the font, compresses the text data when being out of bounds, and adjusts the coordinate position thereof on the base image, and finally, converts the text data into an image to be drawn on the base image. For the table data such as conference list data, it may firstly draw the header data of the table based on the drawing method of the text data, then calculates the coordinate positions of the row and column in the table body on the base image, and draws the content in the cell based on the drawing method of the text data, and finally, converts the table to an image to be drawn on the base image.

In step S1304, after each first data block is drawn on the base image, the base image file may be written to a preset file and compressed. In an embodiment, a combination of miniLZO and ZIP compression may be used. By compressing the file, the data transmission amount during subsequent data distribution may be reduced, thereby increasing the refresh speed of the first display image.

Figure 15:
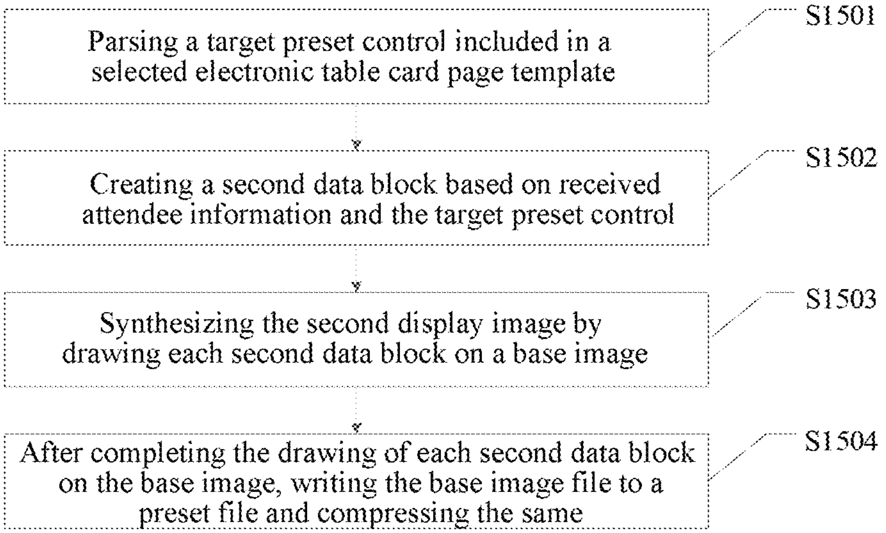
FIG. 15 illustrates a schematic flowchart of a specific image generation process of a second image processing module according to an example embodiment of the present disclosure.

The display data of the electronic table card configured in the above step S412 and step S413 includes conference information and the selected electronic table card page template. Accordingly, in an embodiment, the second image processing module may generate the second display image based on the electronic table card page template and the conference information. Referring to FIG. 15, the specific process of generating the image by the second image processing module may include the following step S1501 to step S1504.

In step S1501, a target preset control included in a selected electronic table card page template is parsed. Specifically, since the electronic table card page template is constructed based on the preset control, it may firstly parse the target preset control included in the selected electronic table card page template. Referring to FIG. 16, in an embodiment, the electronic table card page template defined in JSON format may be used, which includes an image control, a text control, or the like. Such electronic table card page template may be parsed by using a third-party library such as Jackson, Gson, Fastjson or the like. However, the electronic table card page template may also be in other formats, which is not specifically limited in the embodiment.

In step S1502, a second data block is created based on received attendee information and the target preset control. Specifically, after each control is obtained through parsing, the conference information may be passed into the corresponding control. The attendee information may include the name of the attendee, the organization to which the attendee belongs, the job title of the attendee, and the like.

In step S1503, the second display image is synthesized by drawing each second data block on a base image. Specifically, for the image data such as LOGO image, it may directly be drawn on the base image. For the text data such as the name of the attendee, the organization to which the attendee belongs and the job title of the attendee, it may firstly load the font set by the control, then calculates whether the text data is out of bounds (exceeding the length and width of the base image) according to the text data and the font, compresses the text data when being out of bounds, and adjusts the coordinate position thereof on the base image, and finally, converts the text data into an image to be drawn on the base image.

In step S1504, after each second data block is drawn on the base image, the base image file may be written to a preset file and compressed. In an embodiment, a combination of miniLZO and ZIP compression may be used. By compressing the file, the data transmission amount during subsequent data distribution may be reduced, thereby increasing the refresh speed of the second display image.

In step S416, in some embodiments, the number of the gateways and the number of the electronic signages are more than one. Further, a reasonable data distribution route may be determined to ensure communication quality. In this regard, the computing module may dynamically determine a data distribution route for respective electronic signages so as to optimize communication link quality information between the gateway and the electronic signage.

Figure 17:
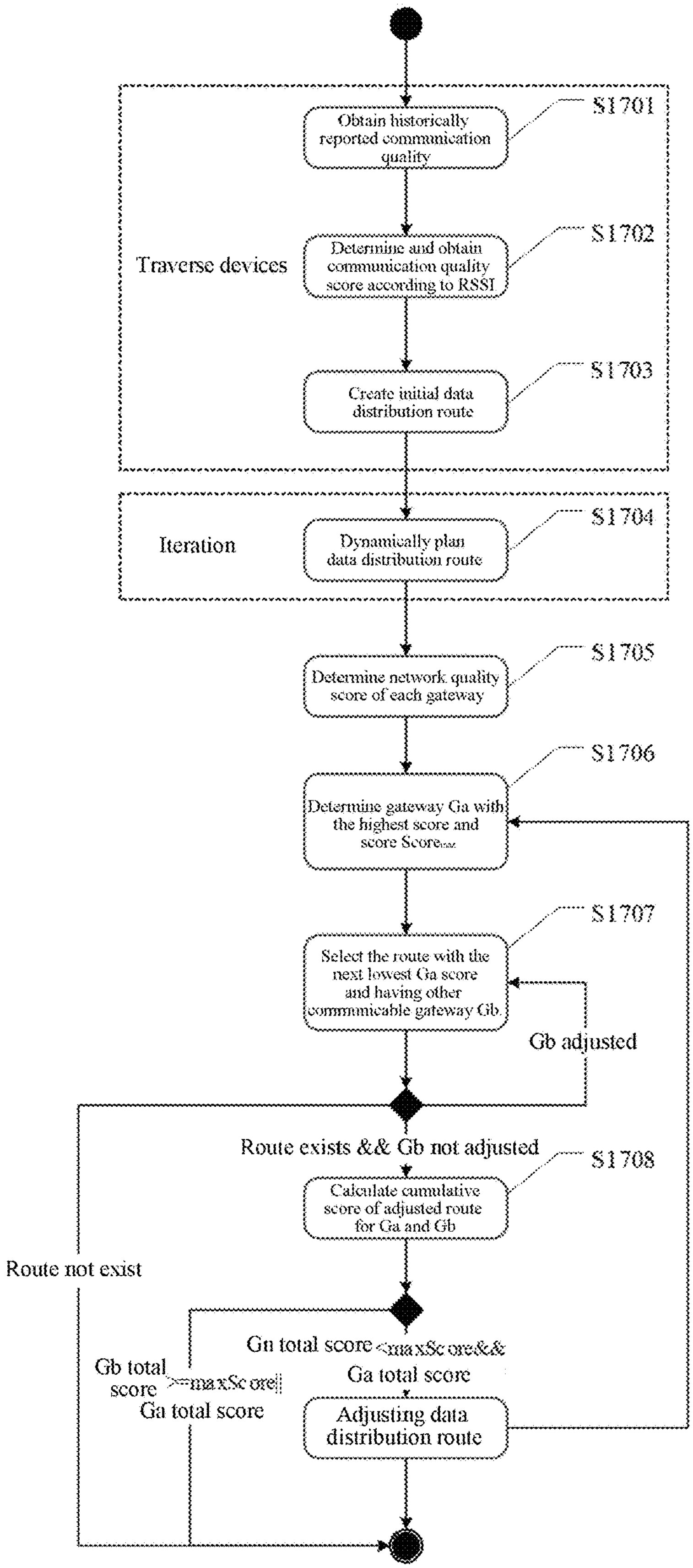
FIG. 17 illustrates a schematic flowchart of determining a data distribution route according to an example embodiment of the present disclosure.

By way of example, with reference to FIG. 17, the data distribution route of the respective electronic signages may be dynamically determined by the following steps S1701 to step S1704.

In step S1701, firstly, the number m of the gateways, the number n of the electronic signages and communication quality data reported historically are obtained by reading a device list and traversing the devices.

In step S1702, a communication quality score Score[i][j] (where i is a gateway serial number and j is an electronic signage serial number) is calculated based on the obtained communication quality data (e.g., RSSI) reported historically. In an embodiment, the score Score may be determined based on the following rules:

$$RSSI = 0, \text{ Score} = 100$$

$$RSSI = [-70, 0), \text{ Score} = 100 + \text{abs}(RSSI)$$

$$RSSI = [-80, -70), \text{ Score} = 170 + (\text{abs}(RSSI) - 70) * 5$$

$$RSSI = RSSI < -80, \text{ Score} = 220 + (\text{abs}(RSSI) - 80) * 10$$

In step S1703, an initial data distribution route is created.

In step S1704, an adjustment is made on the basis of the initial data distribution route by using a dynamic planning method. Specifically, the m gateways may be divided into the first m−1 gateways and the $m^{th}$ gateway, and each assigning of an electronic signage to the $m^{th}$ gateway is on the basis of the optimal strategy of the first m−1 gateways (with the smallest total score). This ensures that each iteration is optimal, and thus the overall communication link quality information is optimal. The optimal value recurrence formula may be shown as follows:

$$\text{minScore}[i][j] = \min(\text{minScore}[i-1][k] + \text{eachScore}[i][j-k])$$

$$\text{where}$$

$$\text{minScore}[i][j] = 0\ (i = 0 \text{ or } j = 0),$$

$$\text{and } k \text{ ranges from } 0 \text{ to } j.$$

During the above assigning process, one gateway may be assigned a plurality of electronic signages, and the other gateways may be assigned very few or no electronic signage, in this case, some further optimization may be made on the result. Further referring to FIG. 17, in order to ameliorate the problem, in some embodiments of the present disclosure, the data distribution route determined in the above step S1704 may also be further optimized by the following steps S1705 to S1708.

In step S1705, a network quality is determined, which includes determining the network quality of each of the gateways under a currently adopted data distribution route and the network quality of each of the gateways under another available data distribution route.

In step S1706, on the basis of the above, for the currently adopted data distribution route, a network quality score of each of the gateways may be calculated, and from which the gateway Ga with the largest network quality score and the corresponding network quality score $\text{Score}_{max}$ (i.e., the gateway with the worst network quality and the corresponding network quality score thereof) may be determined. The same calculation may also be performed for the other available data distribution routes.

An attempt is made to adjust a service of the gateway with the worst network quality under the currently adopted data distribution route to a gateway with a best network quality under a data distribution route with a next worst network quality of that gateway with the worst network quality, which is exemplified below.

In step S1707, for the above gateway Ga, firstly, it may determine whether there are other connectable gateways for the data distribution route with the next lowest network quality score of the gateway Ga. Secondly, if there are other connectable gateways, it uses the data distribution route as a candidate data distribution route, and if there is no such other connectable gateway, it ends the iterative optimization process. Thirdly, it selects the gateway with the smallest network quality score among the candidate data distribution routes. If the gateway with the smallest network quality score has not been adjusted, it is used as the candidate gateway Gb, and if the gateway with the smallest network quality score has been adjusted (e.g., a move-in data distribution route or a move-out data distribution route), it selects the gateway with the next smallest network quality score from the candidate data distribution routes, and so on, until the candidate gateway Gb is identified. After the candidate gateway is identifies, an attempt may be made to adjust the service of the gateway Ga to the candidate gateway Gb, i.e., adjust the communication link of the electronic signage from the service of the gateway Ga to the candidate gateway Gb.

In step S1708, if the network quality of each gateway under the adjusted data distribution route satisfies the judgement condition, it goes to the step of determining the network quality to continue the iteration. For example, the network quality scores of the gateway Ga and the candidate gateway Gb are calculated after the adjustment, and if the network quality score of the candidate gateway Gb is less than the above $\text{Score}_{max}$ and the network quality score of the adjusted gateway Ga, it determines adjusting the service of the gateway Ga to the candidate gateway Gb, and it goes to the above step S1706 to continue iterative optimization until the above judgement condition is not satisfied.

It is to be noted that although a data distribution route determining method is exemplified in the embodiment, the present disclosure is not limited thereto. For example, in other embodiments of the present disclosure, a data distribution route may also be determined based on the bandwidth information of the gateway and the latency information between the gateway and the electronic signage, and so on, which also falls within the protection scope of the present disclosure.

In step S417, after the data distribution route is determined, the device agent module may send the data distribution route and the above-described first display image and second display image to each gateway, and the gateway caches the data for subsequent direct use.

In step S418, when the gateway satisfies an execution condition, the gateway transmits the above-described first display image and the second display image to the electronic doorplate and the electronic table card for display based on the cached data distribution route.

In some embodiments, if the gateway fails in distributing data to the electronic signage, it may also adopt a backoff retry mechanism to retry the distribution. By way of example, in an embodiment, when the gateway fails in distributing data to the electronic signage, it may retry the distribution after waiting a specified time. The specified time grows exponentially, e.g., if the gateway waits for 1 second for the first time, and the exponent is 2, then the gateway waits for 2 seconds for the second time, the gateway waits for 4 seconds for the third time, and so on.

In addition, in order to avoid a plurality of gateways from executing the backoff retry mechanism at the same time, in an embodiment, a jitter may be also added to the backoff retry mechanism so as to spread out the request clusters and avoid conflicts. By way of example, the exponent is a random number within a preset range, such as a random number in the range of 1.5 to 2.5, and the like. In some embodiments, the above exponent may also remain unchanged, and the calculated specified time may be multiplied by a random number within a preset range, for example, a random number within the range of 0.5 to 1.5, etc., which is not specifically limited in the embodiment.

In the above electronic signage control system provided in the embodiment, on the one hand, the position of the electronic signage relative to the gateway is automatically determined based on the communication link quality information between the gateway and the electronic signage, which reduces the workload of manually determining the position, and also improves the efficiency of determining the position; on the other hand, the visual configuration module presents the layout view of the target area, the deployment of the gateway, and the physical position of the electronic signage in the target area, which enables the user to intuitively and quickly learn about the information that the user wants to learn, which improves the efficiency and accuracy of information conveying, and reduces the operation of the user manually checking the information one by one; on further the other hand, the user may manage the content displayed on the electronic signage through the visual configuration module, and also manage the conference to a certain degree, which realizes the "the visible is the controllable", thereby not only enhancing the convenience of user operation, but also enhancing the user interaction experience; and on yet the other hand, based on the above electronic signage control system provided by the embodiment, it may also determine the optimal data distribution route to ensure that the data may be transmitted to the electronic signage in a timely manner with a smaller delay. In addition, when the data transmission fails, the backoff retry mechanism may be executed to complete the compensatory distribution, which increases the distribution success rate to over 99%, and thus improves the robustness of the system.

It is to be noted that although a number of modules or units of the device for action execution are mentioned in the detailed description above, such division is not mandatory. Indeed, according to an implementation of the present disclosure, the features and functions of two or more modules or units described above may be specified in a single module or unit. Conversely, the feature and function of one module or unit described above may be further divided to be specified by more than one module or unit.

Further, an embodiment provides a method of electronic signage control applied to a conference system, and the conference system includes one or more electronic signage communications and a gateway communicatively connected to the one or more electronic signages. The method described with reference to FIG. 18 includes:

step S1810, determining a physical position of an identifier of the electronic signage; and step S1820, displaying a layout view of the target area including an identifier of the electronic signage, wherein a position of the identifier of the electronic signage corresponds in real time to a physical position of the electronic signage in the target area.

The specific details of the steps in the above-described electronic signage control method have already been described in detail in the corresponding electronic signage control system, which therefore will not be repeated herein.

It is to be noted that although the various steps of the method of the present disclosure are described in a specific order in the drawings, which does not require or imply that these steps must be performed in the specific order, or that all the steps shown must be performed to achieve a desired result. Additionally or alternatively, some steps may be omitted, a plurality of steps may be combined into one step for execution, and/or one step may be decomposed into a plurality of steps for execution.

In an embodiment of the present disclosure, an electronic device capable of implementing the above method is also provided.

A person skilled in the art may understand that various aspects of the present disclosure may be implemented as a system, a method, or a program product. Therefore, various aspects of the present disclosure may be specifically implemented in the following forms, namely: a complete hardware implementation, a complete software implementation (including firmware, microcode, and the like), or a combination of hardware and software implementations, which may be collectively referred to as "circuit", "module" or "system" herein.

An electronic device 1900 according to an implementation of the present disclosure will be described below with reference to FIG. 19. The electronic device 1900 shown in FIG. 19 is only an example, which does not limit the function and use scope of the embodiment of the present disclosure.

Figure 19:
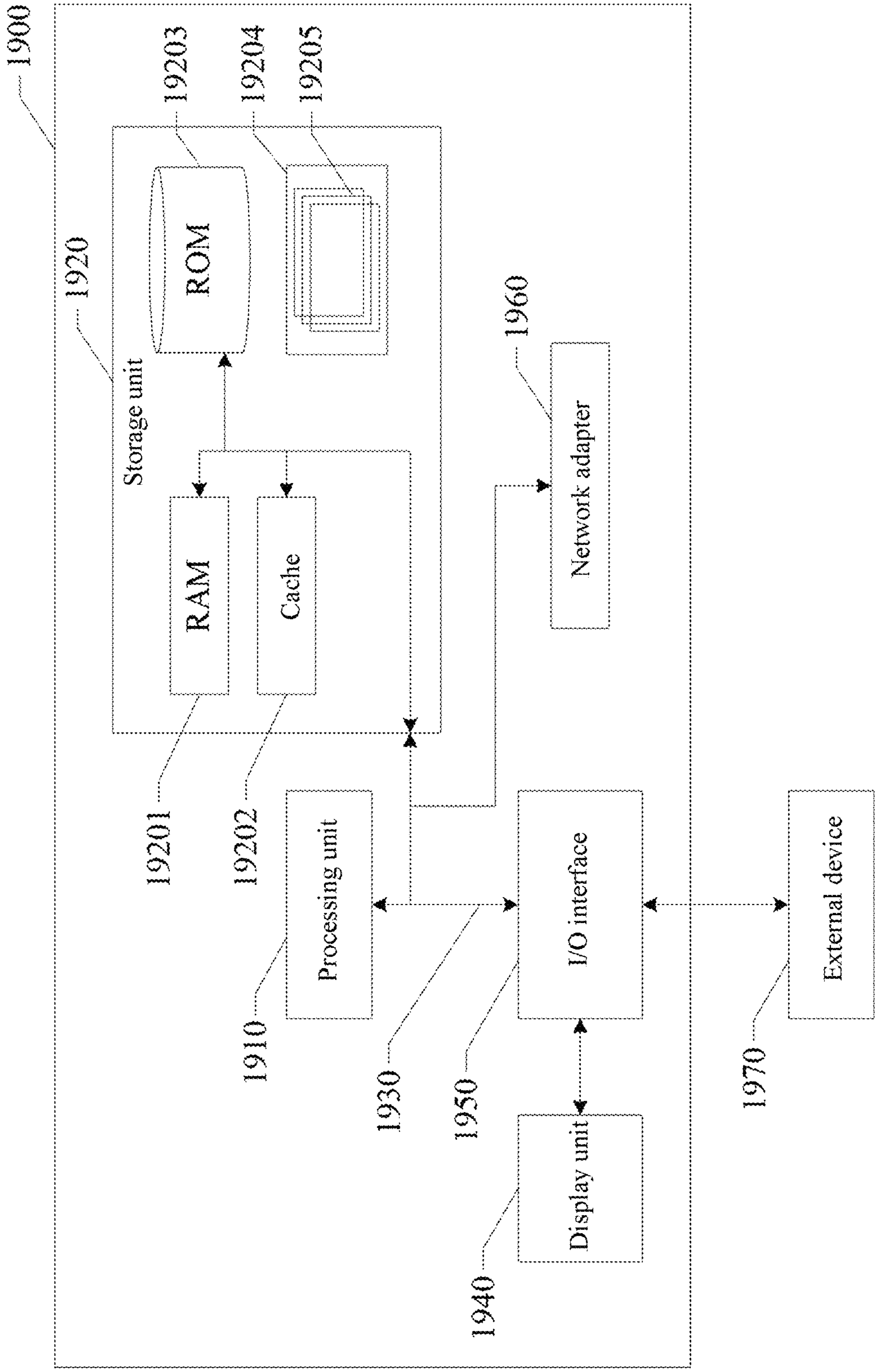
FIG. 19 illustrates an electronic device for implementing the above-described electronic signage control method according to an example embodiment of the present disclosure.

As shown in FIG. 19, the electronic device 1900 is in the form of a general-purpose computing device. The controls of the electronic device 1900 may include, but are not limited to: the aforementioned at least one processing unit 1910, the aforementioned at least one storage unit 1920, a bus 1930 connecting different system controls (including the storage unit 1920 and the processing unit 1910), and a display unit 1940.

Figure 18:
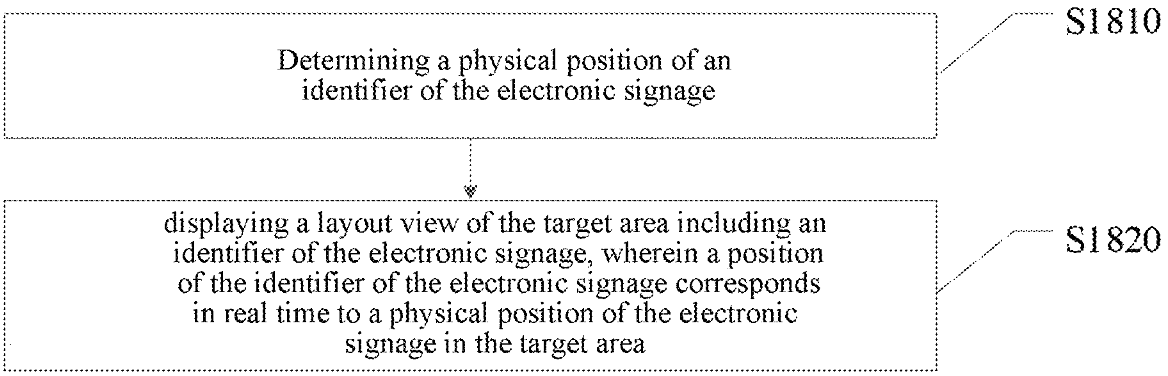
FIG. 18 illustrates a flowchart of an electronic signage control method according to an example embodiment of the present disclosure.

The storage unit stores a program code, and the program code may be executed by the processing unit 1910, so that the processing unit 1910 executes the steps of the various implementations of the present disclosure described in the above method section of the specification. For example, the processing unit 1910 may perform (as shown in FIG. 18): step S1810, determining a physical position of an identifier of the electronic signage; and step S1820, displaying a layout view of the target area including an identifier of the gateway.

The storage unit 1920 may include a readable medium in the form of a volatile storage unit, such as a random access storage unit (RAM) 19201 and/or a cache storage unit 19202, and may further include a read-only storage unit (ROM) 19203.

The storage unit 1920 may also include a program/application tool 19204 having a set (at least one) of program modules 19205. Such program module 19205 includes but is not limited to: an operating system, one or more application programs, other program modules, and program data. Each or some combination of these examples may include the implementation of a network environment.

The bus 1930 may be one or more of several types of bus structures, including a storage unit bus or a storage unit controller, a peripheral bus, a graphics acceleration port, a processing unit, or a local area bus that uses any of a variety of bus structures.

The electronic device 1900 may also communicate with one or more external devices 1970 (such as a keyboard, a pointing device, a Bluetooth device), and may also communicate with one or more devices that enable a user to interact with the electronic device 1900, and/or communicate with any device (such as a router, modem) that enables the electronic device 1900 to communicate with one or more other computing devices. Such communication may be performed through an input/output (I/O) interface 1950. In addition, the electronic device 1900 may also communicate with one or more networks (for example, a local area network (LAN), a wide area network (WAN), and/or a public network, such as the Internet) through the network adapter 1960. As shown in the figure, the network adapter 1960 communicates with other modules of the electronic device 1900 through the bus 1930. It should be understood that although not shown in the figure, other hardware and/or software modules may be used in conjunction with the electronic device 1900, including but not limited to: a microcode, a device driver, a redundant processing unit, an external disk drive array, a RAID system, a tape drive and a data backup storage system.

Through the description of the foregoing embodiments, a person skilled in the art may easily understand that the implementations described herein may be implemented by software, or may be implemented by combining software with necessary hardware. Therefore, the technical solution according to the implementations of the present disclosure may be embodied in the form of a software product, which may be stored in a non-volatile storage medium (which may be a CD-ROM, U disk, mobile hard disk) or on the network, and includes several instructions to cause a computing device (which may be a personal computer, a server, a terminal device, or a network device) to execute the method according to the implementation of the present disclosure.

An embodiment of the present disclosure also provides a computer-readable storage medium having a program product stored thereon which is capable of implementing the above-mentioned method in the specification. In some possible implementations, various aspects of the present disclosure may also be implemented in the form of a program product, which includes a program code. When the program product runs on a terminal device, the program code is used to enable the terminal device to execute the steps of the various implementations of the present disclosure described in the above-mentioned method section of the specification for continuous iteration.

The program product for implementing the above method according to the implementation of the present disclosure may adopt a portable compact disk read-only memory (CD-ROM) and include program code, and may run on a terminal device, such as a personal computer, however, the program product of the present disclosure is not limited thereto. In the present disclosure, the readable storage medium may be any tangible medium that contains or stores a program, and the program may be used by or in combination with an instruction execution system, device, or element.

The program product may use any combination of one or more readable media. The readable medium may be a readable signal medium or a readable storage medium. The readable storage medium may be, for example, but not limited to, an electrical, magnetic, optical, electromagnetic, infrared, or semiconductor system, device, or element, or any combination thereof. More specific examples (non-exhaustive list) of readable storage media include: an electrical connection with one or more wires, a portable disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof.

The computer-readable signal medium may include a data signal propagated in baseband or as a part of a carrier wave, in which a readable program code is carried. The propagated data signal may take many forms, including but not limited to an electromagnetic signal, an optical signal, or any suitable combination thereof. The readable signal medium may also be any readable medium other than the readable storage medium, and the readable medium may send, propagate, or transmit a program for use by or in combination with the instruction execution system, device or element.

The program code contained on the readable medium may be transmitted by any suitable medium, including but not limited to wireless, wired, optical cable, RF or any suitable combination thereof.

The program code for performing the operations of the present disclosure may be written in any combination of one or more programming languages. The programming languages include object-oriented programming languages such as Java, C++, and further include conventional procedural programming languages such as "C" language or similar programming language. The program code may be executed entirely on the user's computing device, executed partly on the user's device, executed as an independent software package, executed partly on the user's computing device and partly on a remote computing device, or executed entirely on the remote computing device or server. In the case of the remote computing device, the remote computing device may be connected to a user computing device through any kind of network, including a local area network (LAN) or a wide area network (WAN), or may be connected to an external computing device (for example, via the Internet by using an Internet service provider).

In addition, the above-mentioned drawings are merely schematic illustrations of the processes included in the method according to the embodiment of the present disclosure, and are not intended for limitation. It is easy to understand that the processes shown in the above drawings do not indicate or limit the time sequence of these processes. In addition, it is easy to understand that these processes may be executed synchronously or asynchronously in a plurality of modules, for example.

A person skilled in the art will easily conceive of other embodiments of the present disclosure after considering the description and practicing the present invention. The present application is intended to cover any variations, uses, or adaptive changes of the present disclosure, which follow the general principles of the present disclosure and include the common knowledge or conventional technical means in the technical field that the present invention belongs to. The description and the embodiments are only regarded as being exemplary, and the true scope and spirit of the present disclosure are pointed out by the claims.

What is claimed is:

1. An electronic signage control system, comprising:

a gateway, communicatively connected to one or more electronic signages in a target area; and a management platform, comprising at least one processor and a memory having computer instructions stored thereon that, when being executed by the at least one processor, cause the management platform to perform actions comprising: displaying a layout view of the target area comprising an identifier of the electronic signage, wherein a position, in the layout view, of the identifier of the electronic signage corresponds in real time to a physical position, in the target area, of the electronic signage, so that when the physical position, in the target area, of the electronic signage changes, the position, in the layout view, of the identifier of the electronic signage is automatically adjusted.

2. The electronic signage control system according to claim 1, wherein the actions further comprise:
determining the physical position of the electronic signage based on positioning information of the electronic signage.

3. The electronic signage control system according to claim 2, wherein
the electronic signage has a positioning chip, and the positioning chip is inbuilt in the electronic signage and is configured to generate the positioning information; or
the system further comprises an auxiliary positioning unit, and the auxiliary positioning unit is arranged in the target area for generating the positioning information.

4. The electronic signage control system according to claim 1, wherein the actions further comprise:
determining the physical position of the electronic signage based on communication link quality information between the gateway and the electronic signage, wherein the communication link quality information comprises at least one of received signal strength indication, signal-to-noise ratio, packet-delivery ratio, bit-error rate or link quality indication.

5. The electronic signage control system according to claim 1, wherein the actions further comprise:
determining a position of the electronic signage relative to the gateway based on communication link quality information between the gateway and the electronic signage, wherein the communication link quality information comprises at least one of received signal strength indication, signal-to-noise ratio, packet-delivery ratio, bit-error rate or link quality indication;
displaying the layout view of the target area comprising an identifier of the gateway; and
displaying the identifier of the electronic signage in the layout view based on the position of the electronic signage relative to the gateway.

6. The electronic signage control system according to claim 5, wherein displaying the layout view of the target area comprising the identifier of the gateway comprises:
receiving layout information of the target area and generating the layout view based on the layout information; and
configuring, in response to a first coordinate selection operation, a position of the identifier of the gateway in the layout view based on a target position of the first coordinate selection operation.

7. The electronic signage control system according to claim 6, wherein determining the position of the electronic signage relative to the gateway comprises:
calculating a distance between the gateway and the electronic signage based on the communication link quality information between the gateway and the electronic signage; and
determining the position of the electronic signage relative to the gateway based on the position of the identifier of the gateway in the layout view and the distance.

8. The electronic signage control system according to claim 7, wherein the actions further comprise:
receiving scanning area configuration information and determining a scanning area of the gateway based on the scanning area configuration information,
wherein determining the position of the electronic signage relative to the gateway based on the position of the identifier of the gateway in the layout view and the distance comprises:
when the system comprises one gateway, determining the position of the electronic signage relative to the gateway based on the distance within the scanning area by taking the position of the identifier of the gateway in the layout view as a starting point; and
when the system comprises a plurality of gateways, determining the position of the electronic signage relative to each of the gateways within the scanning area by a least square method based on the positions of the identifiers of the gateways in the layout view and the respective distances.

9. The electronic signage control system according to claim 1, wherein the actions further comprise:
adjusting, in response to a second coordinate selection operation, the position of the identifier of the electronic signage in the layout view based on a target position of the second coordinate selection operation.

10. The electronic signage control system according to claim 1, wherein the actions further comprise:
differentially displaying, in response to an electronic signage binding operation, the electronic signage targeted by the electronic signage binding operation.

11. The electronic signage control system according to claim 1, wherein the actions further comprise:
in response to a configuration operation of the electronic signage, obtaining a target position targeted by the configuration operation and obtaining display data configured by the configuration operation,
wherein the display data indicates at least a portion of a display content of the electronic signage corresponding to the target position,
wherein obtaining the target position targeted by the configuration operation and obtaining the display data configured by the configuration operation comprises:
parsing one or more configuration parameters input, the configuration parameters comprising the target position and the display data corresponding to the target position.

12. The electronic signage control system according to claim 1, wherein the actions further comprise at least one of:
in response to a first electronic signage configuration operation, setting at least one of the electronic signages as an electronic doorplate, and configuring display data of the electronic doorplate; or
in response to a second electronic signage configuration operation, setting at least one of the electronic signages as an electronic table card, and configuring display data of the electronic table card.

13. The electronic signage control system according to claim 12, wherein configuring the display data of the electronic doorplate comprises:
generating, in response to a configuration operation for one or more first preset controls, one or more electronic doorplate page templates based on the first preset control; and determining the display data of the electronic doorplate based on received conference information and a selected electronic doorplate page template, wherein configuring the display data of the electronic table card comprises:

generating, in response to a configuration operation for one or more second preset controls, one or more electronic table card page templates based on the second preset control; and determining the display data of the electronic table card based on received attendee information and a selected electronic table card page template.

14. The electronic signage control system according to claim 12, wherein the actions further comprise:

updating the identifier of the electronic signage in the layout view based on configuration information in response to determining that the display data of the electronic signage is configured.

15. The electronic signage control system according to claim 12, wherein the actions further comprise at least one of:

generating a first display image based on the display data of the elector generating a second display image based on the display data of the electronic table card and transmitting the second display image to the electronic table card for display.

16. The electronic signage control system according to claim 15, wherein generating the first display image based on the display data of the electronic doorplate comprises:

parsing a target preset control comprised in a selected electronic doorplate page template;

creating a first data block based on received conference information and the target preset control; and synthesizing the first display image by drawing the first data block on a base image, wherein generating the second display image based on the display data of the electronic table card comprises:

parsing a target preset control comprised in a selected electronic table card page template;

creating a second data block based on received attendee information and the target preset control; and synthesizing the second display image by drawing the second data block on a base image.

17. The electronic signage control system according to claim 1, wherein the electronic signage control system comprises more than one gateways and more than one electronic signages, and the actions further comprise:

dynamically determining a data distribution route for respective electronic signages so as to optimize communication link quality information between the gateway and the electronic signage, wherein the communication link quality information comprises at least one of received signal strength indication, signal-to-noise ratio, packet-delivery ratio, bit-error rate or link quality indication.

18. The electronic signage control system according to claim 17, wherein the actions further comprise:

determining a network quality, wherein determining the network quality comprises determining the network quality of each of the gateways under a currently adopted data distribution route and the network quality of each of the gateways under another available data distribution route;

adjusting a service of a gateway with a worst network quality under the currently adopted data distribution route to a gateway with a best network quality under a data distribution route with a next worst network quality of that gateway with the worst network quality; and in response to determining that the network quality of each of the gateways under an adjusted data distribution route satisfies a judgement condition, going to the step of determining the network quality to continue an iteration.

19. The electronic signage control system according to claim 17, wherein the gateway is further configured to:

re-distribute data to the electronic signage after a specified time when the gateway fails to distribute the data to the electronic signage, wherein the specified time grows exponentially with an exponent being a random number within a preset range.

20. An electronic signage control method, applied to a target area comprising one or more electronic signages and a gateway communicatively connected to the one or more electronic signages, comprising:

determining a physical position of an identifier of the electronic signage; and displaying a layout view of the target area comprising an identifier of the electronic signage, wherein a position, in the layout view, of the identifier of the electronic signage corresponds in real time to a physical position, in the target area, of the electronic signage, so that when the physical position, in the target area, of the electronic signage changes, the position, in the layout view, of the identifier of the electronic signage is automatically adjusted.

* * * * *